United States Patent
Nishikawa et al.

(10) Patent No.: US 7,027,180 B2
(45) Date of Patent: Apr. 11, 2006

(54) INFORMATION PROCESSING APPARATUS AND METHOD

(75) Inventors: Satoshi Nishikawa, Kanagawa (JP); Koji Nakagiri, Kanagawa (JP); Yasuo Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 924 days.

(21) Appl. No.: 09/986,556

(22) Filed: Nov. 9, 2001

(65) Prior Publication Data

US 2002/0059338 A1 May 16, 2002

(30) Foreign Application Priority Data

Nov. 13, 2000 (JP) .............................. 2000-345610

(51) Int. Cl.
G06F 15/00 (2006.01)
H04N 1/21 (2006.01)
B42C 11/00 (2006.01)

(52) U.S. Cl. ..................... 358/1.18; 358/1.15; 358/296; 412/4

(58) Field of Classification Search ............... 358/1.18, 358/296, 1.15; 412/4, 8, 16, 19, 32; 399/189, 399/380, 382; 715/517; 400/16

See application file for complete search history.

(56) References Cited

U.S. PATENT DOCUMENTS

| 5,124,731 A | * | 6/1992 | Knodt et al. ................. 347/129 |
| 5,671,463 A | * | 9/1997 | Morikawa et al. ............. 399/86 |
| 6,213,703 B1 | | 4/2001 | Garrido ..................... 270/1.02 |
| 6,307,637 B1 | | 10/2001 | Kujirai | |

FOREIGN PATENT DOCUMENTS

WO  WO 01/56794  8/2001

* cited by examiner

Primary Examiner—Twyler Lamb
Assistant Examiner—Rashan Patterson
(74) Attorney, Agent, or Firm—Fitzpatrick, Cella, Harper & Scinto

(57) ABSTRACT

An information processing apparatus for making a bookbinding setup for a document includes a cover page determination unit for determining pages to be imposed on a cover from input data of a plurality of pages, a cover imposing processing unit for executing an imposing process of cover pages on the basis of data of the pages determined by the cover page determination unit, and a bookbinding imposing processing unit for executing an imposing process of running text pages on the basis of data of the remaining pages which are not imposed on the cover pages by the cover imposing processing unit, thus allowing an information process for making a bookbinding setup that the user wants.

16 Claims, 30 Drawing Sheets

FIG. 10

| |
|---|
| ID WHICH CAN IDENTIFY JOB ~1001 |
| JOB SETUP INFORMATION ~1002 |
| NUMBER OF PHYSICAL PAGES OF JOB ~1003 |
| FIRST PHYSICAL PAGE INFORMATION ~1004 |
| SECOND PHYSICAL PAGE INFORMATION ~1005 |
| ..... ~1006 |
| LAST PHYSICAL PAGE INFORMATION ~1007 |

FIG. 11

| |
|---|
| TOTAL NUMBER OF PHYSICAL PAGES ~1101 |
| TOTAL NUMBER OF LOGICAL PAGES ~1102 |
| NUMBER OF COPIES ~1103 |
| COPY SET PRINT ~1104 |
| FINISHING INFORMATION ~1105 |
| ADDITIONAL PRINT INFORMATION ~1106 |

FIG. 29

INFORMATION PROCESSING APPARATUS AND METHOD

FIELD OF THE INVENTION

The present invention relates to an information processing apparatus and method, a program for making a computer execute that information process, and a computer-readable storage medium which stores the program and, more particularly, to an apparatus and method for executing an information process, which is used to make bookbinding setups for a document without using any cover insert function of a device, and can obtain a book cover that the user requires.

BACKGROUND OF THE INVENTION

In a conventional system, an information processing apparatus such as a personal computer or the like, which is connected to a printer, comprises a spooler for temporarily saving data in a data format (so-called intermediate code format) different from that of print data to be finally output to the printer before print data to be sent from that information processing apparatus to the printer is generated, a despooler for generating print data to be finally sent to the printer from the data which is temporarily saved in the intermediate code format, and a unit for generating a printer control command. In terms of a conventional bookbinding function, a bookbinding function implemented by generating a control command for a bookbinding print process in that system, and that using a device are available. In some latest devices, an inserter device can be attached as an option, and a cover insert function using that device is available.

However, the aforementioned system does not have any means for attaching a book cover except for the insert function of the device. Also, the insert function of the device does not have any means for selecting obverse and reverse pages of front and back covers.

When a document, which is generated using an application in consideration of the rendering contents of a cover, is printed using a bookbinding print function of a printer driver, if the number of logical pages of the document output from the application is a multiple of 4, it is possible to print while considering the outermost sheet as a cover. However, if the number of logical pages is not a multiple of 4, the rendering contents that consider the cover can be printed on a "front cover" and its "reverse", but cannot be printed on a "back cover" and "reverse of back cover". For example, when the application generates a document consisting of seven pages (four pages for cover pages) in consideration of the rendering contents, if a bookbinding print function of a normal printer driver is used, the "front cover" and "reverse" of a cover paper sheet are normally printed, but the seventh logical page to be printed on the "back cover" is printed on the "reverse of back cover", no data is printed on the "back cover", and such prints are exhausted, as shown in FIG. 30.

SUMMARY OF THE INVENTION

The present invention has been proposed to solve the conventional problems, and has as its object to provide an information processing apparatus and method which executes an information process for making bookbinding setups for a document without using a cover insert function of a device, and automatically executes an imposing process for a cover paper sheet, a program for implementing that information process, and a computer readable storage medium that stores the program.

It is another object of the present invention to provide an information processing apparatus and method which can obtain a book cover that the user wants by selecting the obverse and reverse pages of front and back covers to be printed, a program for implementing that information process, and a computer readable storage medium that stores the program.

In order to achieve the above objects, an information processing apparatus and method, a program for making a computer execute the information process, and a storage medium that stores a program module used to run that program on the computer are characterized by having the following arrangements.

That is, an information processing apparatus for making a bookbinding setup for a document, comprises:

cover page determination means for determining pages to be imposed on a cover from input data of a plurality of pages;

cover imposing processing means for executing an imposing process of cover pages on the basis of data of the pages determined by the cover page determination means; and bookbinding imposing processing means for executing an imposing process of running text pages on the basis of data of the remaining pages which are not imposed on the cover pages by the cover imposing processing means.

Preferably, the above information processing apparatus further comprises:

first determination processing means for checking if the total number of pages of print data is not less than n;

first imposing processing means for, when the first determination processing means determines that the total number of pages of print data is not less than n, executing a first imposing process of cover pages;

bookbinding imposing processing means for executing a bookbinding imposing process of the remaining pages after the process of the first imposing processing means; and second imposing processing means for, when the first determination processing means determines that the total number of pages of print data is less than n, executing a second imposing process of less than n cover pages.

Preferably, the above information processing apparatus further comprises second determination processing means for determining cover pages to be printed.

Preferably, in the above information processing apparatus, the cover imposing processing means comprises processing means for imposing first and second pages on obverse and reverse surfaces of a front cover, and processing means for imposing a last page and last page—1 on obverse and reverse surfaces of a back cover.

Preferably, in the above information processing apparatus, the second determination processing means for determining cover pages to be printed comprises:

third determination processing means for checking if the obverse surface of the front cover is to be printed;

fourth determination processing means for checking if the reverse surface of the front cover is to be printed;

fifth determination processing means for checking if the obverse surface of the back cover is to be printed; and sixth determination processing means for checking if the reverse surface of the back cover is to be printed.

An information processing method for making a bookbinding setup for a document, comprises:

the cover page determination step of determining pages to be imposed on a cover from input data of a plurality of pages;

the cover imposing processing step of executing an imposing process of cover pages on the basis of data of the pages determined in the cover page determination step; and the bookbinding imposing processing step of executing an imposing process of running text pages on the basis of data of the remaining pages which are not imposed on the cover pages in the cover imposing processing step.

A computer readable storage medium stores a program module that executes an information process for making a bookbinding setup for a document, and the program module comprises:

a cover page determination module for determining pages to be imposed on a cover from input data of a plurality of pages;

a cover imposing processing module for executing an imposing process of cover pages on the basis of data of the pages determined by the cover page determination module; and a bookbinding imposing processing module for executing an imposing process of running text pages on the basis of data of the remaining pages which are not imposed on the cover pages by the cover imposing processing module.

A program makes a computer execute an information process for making a bookbinding setup for a document, and the program executes the information process by specifying functions to be executed by the computer as:

cover page determination means for determining pages to be imposed on a cover from input data of a plurality of pages;

cover imposing processing means for executing an imposing process of cover pages on the basis of data of the pages determined by the cover page determination means; and bookbinding imposing processing means for executing an imposing process of running text pages on the basis of data of the remaining pages which are not imposed on the cover pages by the cover imposing processing means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 shows an example of a job output setup file that saves information which forms printable physical pages generated by the spool file manager 304 in step S608;

FIG. 11 shows an example of job setup information in a field 1002 shown in FIG. 10;

FIG. 29 shows a user interface of a driver according to the embodiment of the present invention.

DETAILED DESCRIPTION OF THE PREFERRED EMBODIMENTS

Preferred embodiments of the present invention will now be described in detail in accordance with the accompanying drawings.

First Embodiment

Figure 1:
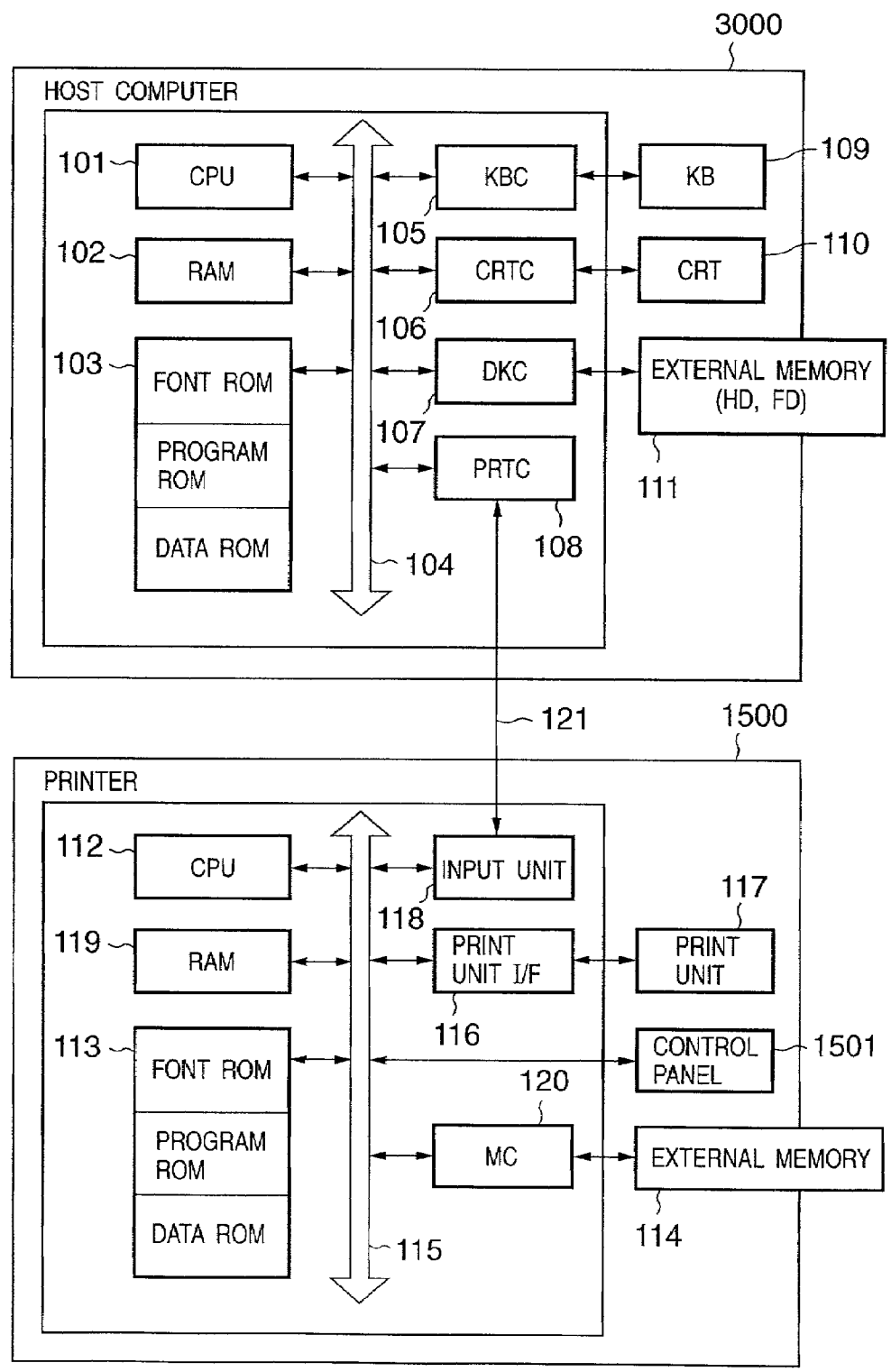
FIG. 1 is a block diagram for explaining the arrangement of a print control apparatus according to an embodiment of the present invention.

Preferred embodiments of the present invention will be explained below. FIG. 1 is a block diagram for explaining the arrangement of a printer control system according to an embodiment of the present invention. Note that the present invention can be applied to any of a standalone device, a system built by a plurality of devices, and a system in which devices are connected via a network such as a LAN, WAN, or the like to execute processes, as long as the functions of the present invention are implemented.

Referring to FIG. 1, a host computer 3000 comprises a CPU 101 that processes a document including figures, images, text, tables (including a spreadsheet or the like), and the like on the basis of a document processing program stored in a program ROM in a ROM 103 or an external memory 111, and systematically controls devices connected to a system bus 104. The program ROM in the ROM 103 or external memory 111 stores an operating system program (to be referred to as an OS hereinafter) or the like as a control program of the CPU 101, a font ROM in the ROM 103 or the external memory 111 stores font data or the like used in the document process, and a data ROM in the ROM 103 or the external memory 111 stores various data used upon executing the document process. A RAM 102 serves as a main memory, work area, and the like of the CPU 101.

A keyboard controller (KBC) 105 controls key input from a keyboard 109 and a pointing device (not shown). A CRT controller (CRTC) 106 controls display of a CRT display (CRT) 110. Reference numeral 107 denotes a disk controller (DKC) which controls access to the external memory 111 such as a hard disk (HD), floppy disk (FD), and the like, which store a boot program, various application programs, font data, user files, edit files, a printer control command generation program (to be referred to as a printer driver hereinafter), and the like. A printer controller (PRTC) 108 is connected to a printer 1500 via a two-way interface (interface) 121 to implement a communication control process with the printer 1500.

Note that the CPU 101 rasterizes outline font data on a display information RAM assured on, e.g., the RAM 102 to realize WYSIWYG on the CRT 110. The CPU 101 opens various registered windows on the basis of commands instructed by a mouse cursor (not shown) or the like on the CRT 110, and executes various data processes. The user can set a print processing method for the printer driver including the printer setup and print mode selection by opening a window that pertains to the print setups upon executing a print process.

The printer 1500 is controlled by a CPU 112. The printer CPU 112 outputs an image signal as output information to a print unit (printer engine) 117, which is connected to a system bus 115, on the basis of a control program or the like stored in a program ROM in a ROM 113, or a control program or the like stored in an external memory 114. The program ROM in the ROM 113 stores the control program and the like of the CPU 112. A font ROM in the ROM 113 stores font data or the like upon generating the output information, and a data ROM in the ROM 113 stores information and the like used on the host computer when the printer has no external memory 114 such as a hard disk or the like.

The CPU 112 can communicate with the host computer via an input unit 118, and can inform the host computer 3000 of information or the like in the printer. A RAM 119 serves as a main memory, work area, and the like of the CPU 112, and its memory size can be expanded by an option RAM connected to an expansion port (not shown). Note that the RAM 119 is used as an output information rasterizing area, environment data storage area, NVRAM, and the like. Access to the aforementioned external memory 114 such as a hard disk (HD), IC card, or the like is controlled by a memory controller (MC) 120. The external memory 114 is connected as an option, and stores font data, an emulation program, form data, and the like. On the input unit 118, operation switches, LED indicators, and the like which are used to make operations on a control panel are arranged.

The number of external memories 14 is not limited to one, but a plurality of external memories 14 may be connected. That is, a plurality of option font cards in addition to built-in fonts and external memories that store programs for interpreting printer control languages of different language systems may be connected. Furthermore, an NVRAM (not shown) may be connected, and may store printer mode setup information from a control panel 1501.

Figure 2:
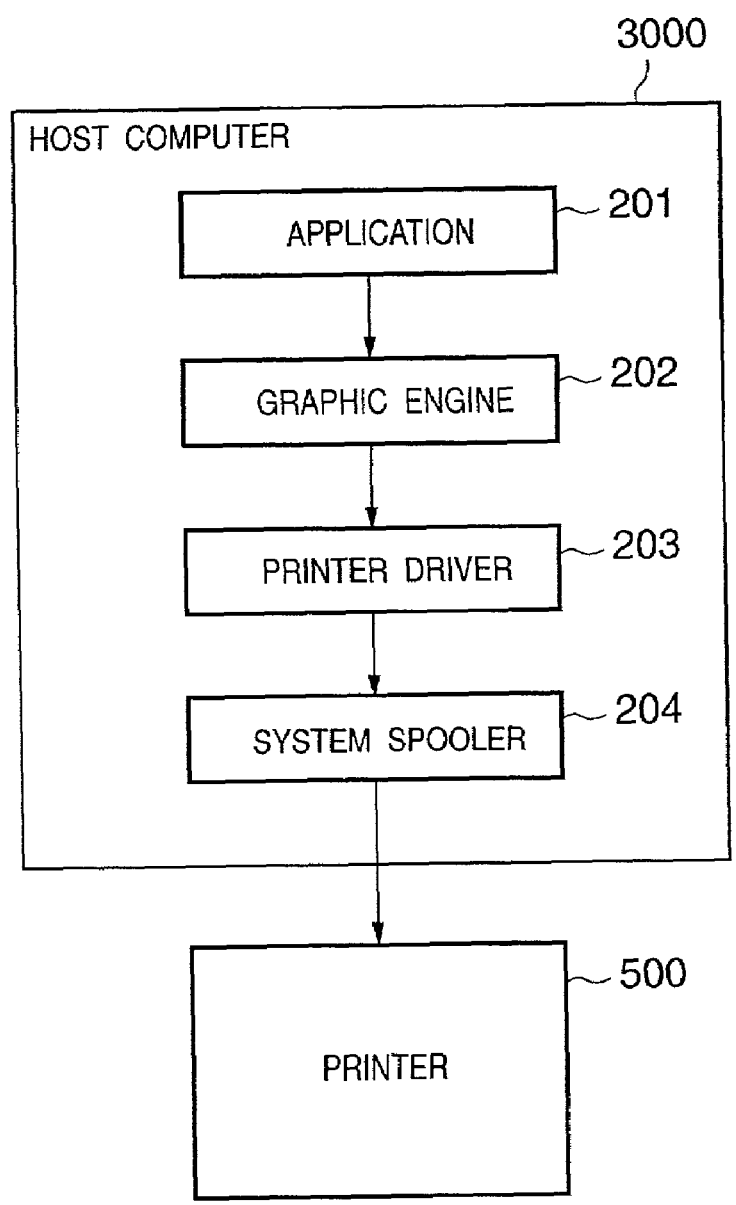
FIG. 2 is a block diagram showing the arrangement of a typical print system built by a host computer to which a printer is connected.

FIG. 2 shows the configuration of a typical print process in the host computer to which a printing apparatus such as a printer or the like is connected directly or via a network. Referring to FIG. 2, an application 201, graphic engine 202, printer driver 203, and system spooler 204 are program modules which are stored as files in the external memory 111, and are loaded onto the RAM 102 by the OS or a module that uses the corresponding module upon execution. The application 201 and printer driver 203 can be added to the HD in the external memory 111 using the FD in the external memory 111 or a CD-ROM (not shown), or via a network (not shown). The application 201 stored in the external memory 111 is loaded onto the RAM 102 upon execution. When the application 201 executes a print process with respect to the printer 1500, it outputs (renders) data using the graphic engine 202 which is similarly loaded onto the RAM 102 upon execution.

The graphic engine 202 similarly loads a printer driver 203 which is prepared for each printing apparatus from the external memory 111 onto the RAM 102, and sets the output from the application 201 in the printer driver 203. The graphic engine 202 then converts a GDI (Graphic Device Interface) function received from the application 201 into a DDI (Device Driver Interface) function, and outputs the DDI function to the printer driver 203. The printer driver 203 converts the DDI function received from the graphic engine 202 into a control command, e.g., PDL (Page Description Language) that the printer can recognize. The converted printer control command is output as print data to the printer 1500 via the interface 121 by the system spooler 204 which is loaded onto the RAM 102 by the OS.

Figure 3:
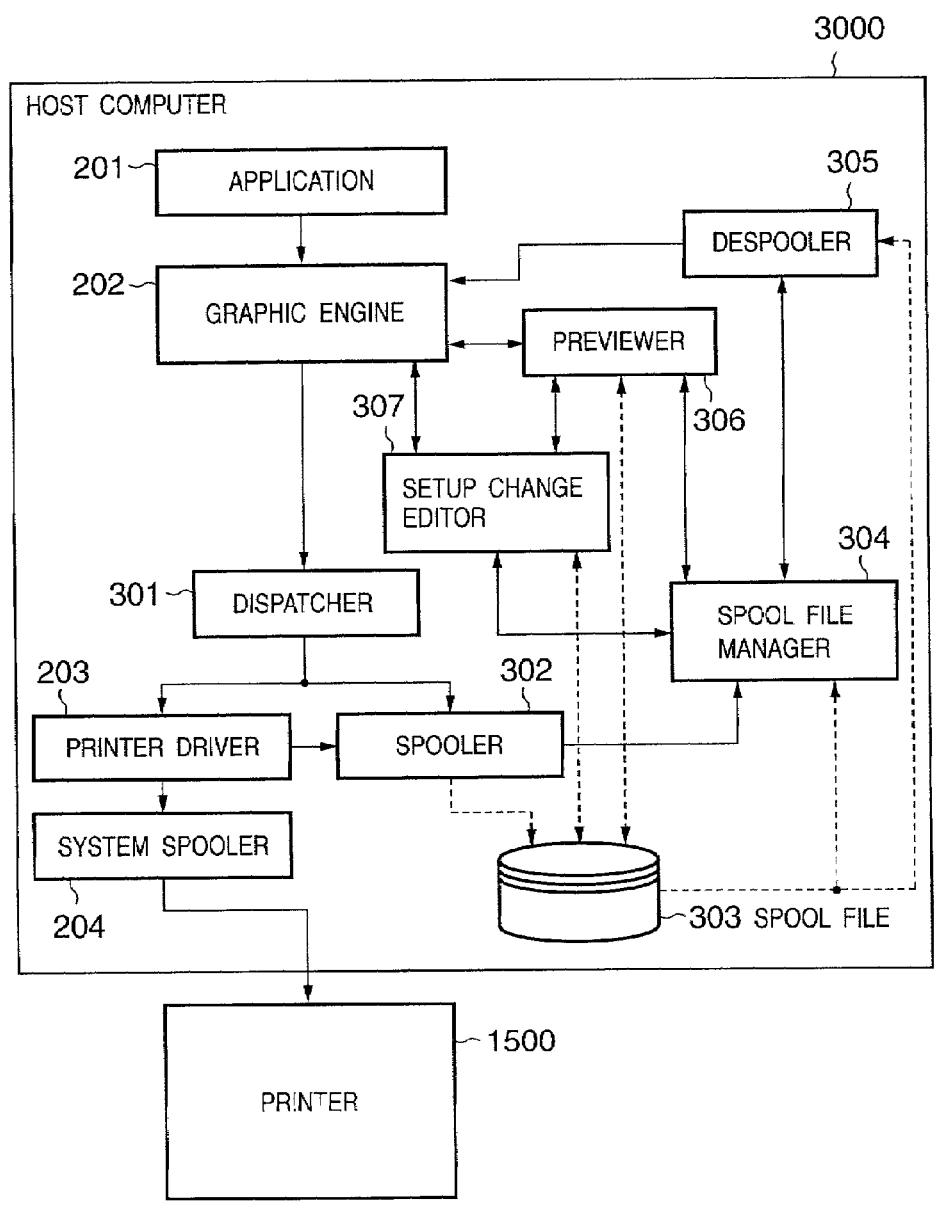
FIG. 3 is a block diagram showing the arrangement of a print system which temporarily spools intermediate codes before a print command from an application is converted into a print control command.

The print system of this embodiment also has an arrangement for temporarily spooling print data from the application as intermediate codes, as shown in FIG. 3, in addition to the print system constructed by the printer and host computer shown in FIG. 2.

FIG. 3 shows the expanded system of FIG. 2. This system temporarily generates a spool file 303 consisting of intermediate codes upon sending a print command from the graphic engine 202 to the printer driver 203. In the system shown in FIG. 2, the application 201 is released from the print process when the printer driver 203 has converted all print commands from the graphic engine 202 into printer control commands. By contrast, in the system shown in FIG. 3, a spooler 302 converts all print commands into intermediate code data, and the application 201 is released from the print process when it outputs print commands to the spool file 303. Normally, the latter system can shorten the processing time.

In the system shown in FIG. 3, the contents of the spool file 303 can be processed. In this way, functions such as enlargement/reduction, reduced-scale print of a plurality of pages on one page, and the like that the application does not have can be implemented for print data from the application.

For these purposes, the system of this embodiment is attained by expanding the system shown in FIG. 2 to spool data as intermediate codes, as shown in FIG. 3. In order to process print data, setups are normally made from a window provided by the printer driver 203, which saves the setup contents on the RAM 102 or external memory 111.

FIG. 3 will be explained in detail below. As shown in FIG. 3, in this expanded processing system, a dispatcher 301 receives a DDI function as a print command from the graphic engine 202. When the print command (DDI function) that the dispatcher 301 receives from the graphic engine 202 is based on a print command (GDI function) issued from the application 201 to the graphic engine 202, the dispatcher 301 loads the spooler 302 stored in the external memory 111 onto the RAM 102, and sends the print command (DDI function) to the spooler 302 in place of the printer driver 203.

The spooler 302 interprets the received print command, converts it into intermediate codes for respective pages, and outputs the codes to the spool file 303. The spool file of intermediate codes stored for respective pages is called a page description file (PDF). The spooler 302 acquires processing setups (Nup, two-side, staple, color/monochrome designation, or the like) associated with print data set in the printer driver 203 from the printer driver 203, and saves them as a setup file for each job in the spool file 303. The setup file stored for respective jobs is called a job setup file (also called an SDF as an abbreviation for a spool description file).

The job setup file will be described later. Note that the spool file 303 is generated as a file on the external memory 111, but may be generated on the RAM 102. Furthermore, the spooler 302 loads a spool file manager 304 stored in the external memory 111 onto the RAM 102, and informs the spool file manager 304 of the generation state of the spool file 303. After that, the spool file manager 304 checks if a print process can be done in accordance with the contents of the processing setups associated with print data, which are saved in the spool file 303.

If the spool file manager 304 determines that the print process can be done using the graphic engine 202, it loads a despooler 305 stored in the external memory 111 onto the RAM 102, and instructs the despooler 305 to execute the print process of the page description files of intermediate codes described in the spool file 303. The despooler 305 processes the page description files of intermediate codes included in the spool file 303 in accordance with the job setup file which is included in the spool file 303 and includes processing setup information, re-generates a GDI function, and outputs it via the graphic engine 202 once again.

When the print command (DDI function) that the dispatcher 301 receives from the graphic engine 202 is based on a print command (GDI function) issued from the despooler 305 to the graphic engine 202, the dispatcher 301 sends the print command to the printer driver 203 in place of the spooler 302. The printer driver 203 generates a printer control command described in a page description language or the like on the basis of the DDI function acquired from the graphic engine 202, and outputs the generated command to the printer 1500 via the system spooler 204.

Furthermore, FIG. 3 shows an example which includes a previewer 306 and setup change editor 307 in addition to the expanded system described so far, and allows a print preview process, print setup change process, and combination process of a plurality of jobs. In order to implement the print preview process, print setup change process, and combination process of a plurality of jobs, the user must designate "store" on a pull-down menu as a means for "designating an output destination" in a property window of the printer driver shown in FIG. 9. When the user wants to only preview, he or she can select "preview" as designation of the output destination.

Figure 16:
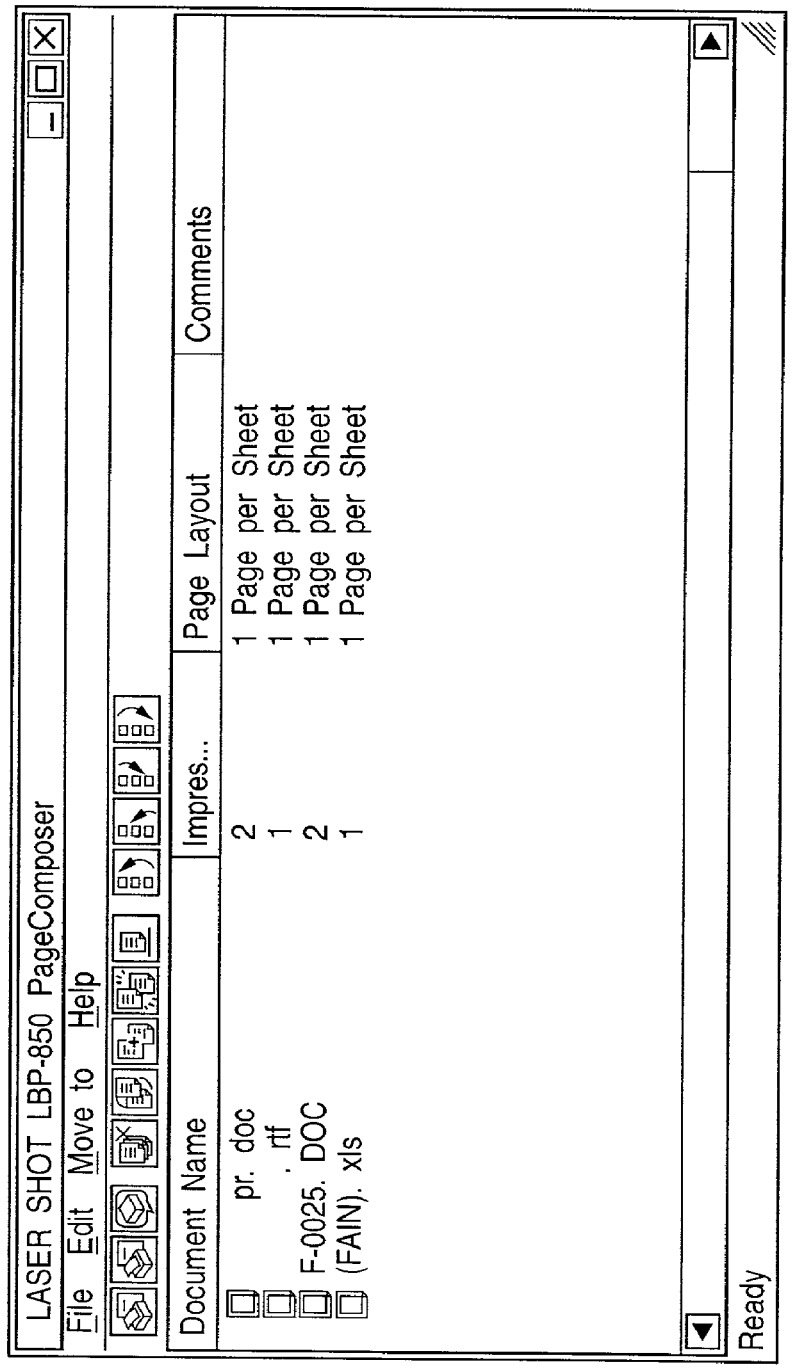
FIG. 16 shows an example of a window that displays a list of print jobs spooled in the spool file manager 304.

The contents set on the property window of the printer driver in this way are stored in a structure (for example, a structure called DEVMODE in Windows OS) provided by the OS as a setup file. In that structure, the processing setup contained in the spool file 303 includes a setup indicating if data is to be stored in the spool file manager 304. When the spool file manager 304 reads the processing setup via the printer driver 203 and that setup includes store designation, the spool file 303 generates and stores a page description file and job setup file, as described above. Then, the window of the spool file manager 304 pops up, as shown in FIG. 16, and displays a list of jobs spooled by the spool file 303. FIG. 16 shows an example wherein four jobs are spooled, and operations for each job can be selected from a menu bar or by pressing menu icons below the menu bar.

The number of operations that can be selected from the menu bar is the same as that of the menu icons. The following 11 types of operations are available: "print" which executes a given job while selecting that job; "save & print" which executes a print process while saving a spool file of intermediate codes; "preview" which displays output preview of a job in consideration of the print setups; "delete" which deletes a spool file of intermediate codes; "copy" which generates a copy of a spool file of intermediate codes; "combine" which combines a plurality of jobs of spool files of intermediate codes into one job; "divide" which divides the combined job into a plurality of original jobs; "job edit" which changes the print setups (layout setup, finishing setup, and the like) of an independent or combined job; "move to top" which moves the print order of a given job to the top of a job list; "move up by one" which advances the print order of a given job by one; "move down by one" which delays the print order of a given job by one; and "move to last" which moves the print order of a given job to the last of a job list. When "preview" of an independent or combined job is designated on the window (FIG. 16) of the spool file manager, the previewer 306 stored in the external memory 111 is loaded onto the RAM 102, and is instructed to execute a preview process of a job of the intermediate codes described in the spool file 303.

The previewer 306 sequentially reads out page description files (PDF) of intermediate codes included in the spool file 303, processes them in accordance with the contents of processing setup information included in the job setup file (SDF) stored in the spool file 303, and outputs a GDI function to the graphic engine 202. The graphic engine 202 can output a preview window onto the screen by outputting rendering data on its own client area.

The graphic engine 202 can appropriately render in correspondence with the designated output destination. The previewer 306 implements preview by the method of processing intermediate codes included in the spool file 303 in accordance with the contents of the processing setups included in the spool file 303 and outputting them using the graphic engine as in the despooler 305. In this way, since the processing setups set in the printer driver are stored as a job setup file in the spool file 303 and data of the page description file are processed and output based on the job setup file, a print preview approximate to an actual printout can be provided to the user in correspondence with the way actual rendering data is printed and designated processes (e.g., an Nup process (for laying out and printing N logical pages on one physical page), a two-sided print process, a bookbinding print process, a stamp process, and the like). Since the preview function of conventional application software such as document creation software renders based on page setups in that application, the print setups in the printer driver are not reflected in preview, and the user cannot recognize a preview of an image to be actually printed out.

Figure 17:
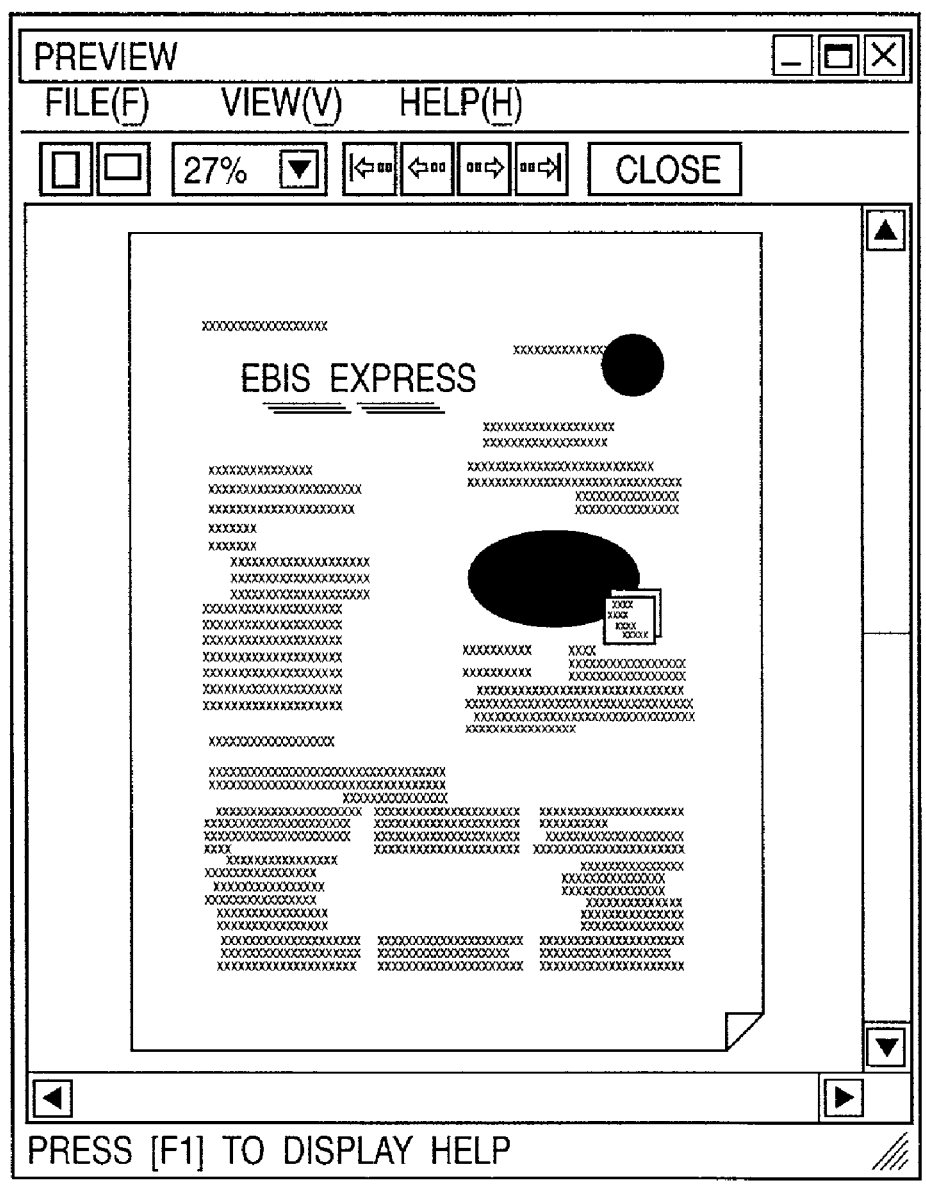
FIG. 17 shows an example of a window of a previewer 306.

By executing the preview process in this fashion, a large preview image of an image processed in accordance with the print processing setups saved in the spool file 303 is displayed on the screen by the previewer 306, as shown in FIG. 17. After that, the previewer 306 is closed in response to the user's non-display instruction, and the control shifts to the window (FIG. 16) of the spool file manager.

When the user wants to print the contents displayed by the previewer 306, he or she issues a print request by selecting "print" or "save & print" on the spool file manager 304. In response to the print request, the despooler 305 generates a GDI function by processing each page description file based on the job setup file, and passes it to the graphic engine 202. Then, a print command is sent to the printer driver 203 via the dispatcher 301, thus executing the print process.

A setup change process using the setup change editor 307 will be explained below. The setup change process can be done for a "store"-designated job in FIG. 9 as in the preview process. The window of the spool file manager 304 pops up in the same sequence as in the preview process, and displays a list of spooled jobs. When a setup change instruction is issued by designating "job edit" for the selected spool file on the window (FIG. 16) of the spool file manager, the setup change editor 307 stored in the external memory 111 is loaded onto the RAM 102 and is instructed to display current or default processing setups. Then, a job setup window shown in FIG. 18 is displayed.

Figure 18:
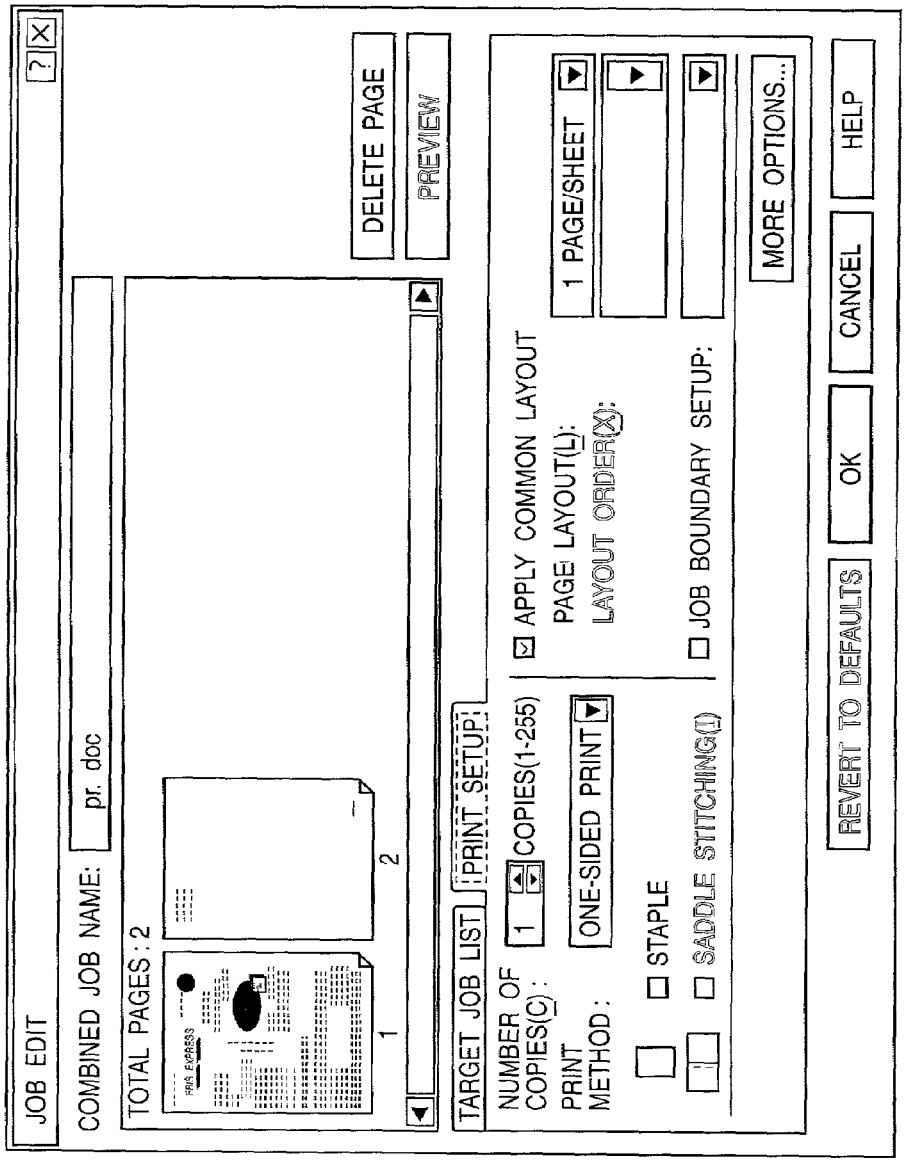
FIG. 18 shows an example of a window of the setup change editor 307.

The setup change editor 307 acquires the job setup file of the "job edit"-designated job, and changes default values of the job setup window in FIG. 18 on the basis of setup items designated in that job setup file. In the example shown in FIG. 18, the job setup file of the "job edit"-designated file is designated with the number of copies: 1, print method: one-side, staple: none, layout: 1 page/sheet, and the like.

This setup change editor 307 can also make a small preview output on the window shown in FIG. 18 by processing each page description file of intermediate codes stored in the spool file 303 in accordance with the contents of the processing setups included in the job setup file stored in the spool file 303, and outputting them onto its own client area using the graphic engine 202.

Also, this editor can change and correct the contents of the processing setups included in the job setup file stored in the spool file 303. In this case, the user interface on the setup change editor 307 may have items that the printer driver 203 can set, or the user interface of the printer driver 203 itself may be called. As shown in FIG. 18, the number of copies, the print method (one-side, two-side, bookbinding print), staple (saddle finisher, or the like), page layout, layout order, and the like can be designated. Upon pressing "detailed setups", most of items that the printer driver can designate can be re-set. However, changes of setups that pertain to print quality such as the resolution, graphic mode, and the like are not permitted.

When the changed items are confirmed in accordance with a confirmation request on the setup change editor 307, the control shifts to the spool file manager 304. The confirmed print setups that have been changed are saved. In this case, the setups are not saved in an original job setup file, but a new job output setup file used in the job edit process or the like is created to save the setups. Details of the job output setup file will be described later using FIG. 10 and the subsequent figures.

If the user wants to print in accordance with the changed setup contents as in confirmation on the previewer 306, the spool file manager 304 issues a print request. The print request is sent to the graphic engine 202, and a print command is sent to the printer driver 203 via the dispatcher 301, thus executing the print process.

On the window (FIG. 16) of the spool file manager, the user can designate to combine a plurality of print jobs to execute them as a single print job. This process is also premised on the "store"-designated job on the property window of the printer driver shown in FIG. 9 as in the preview and setup change processes.

Figure 9:
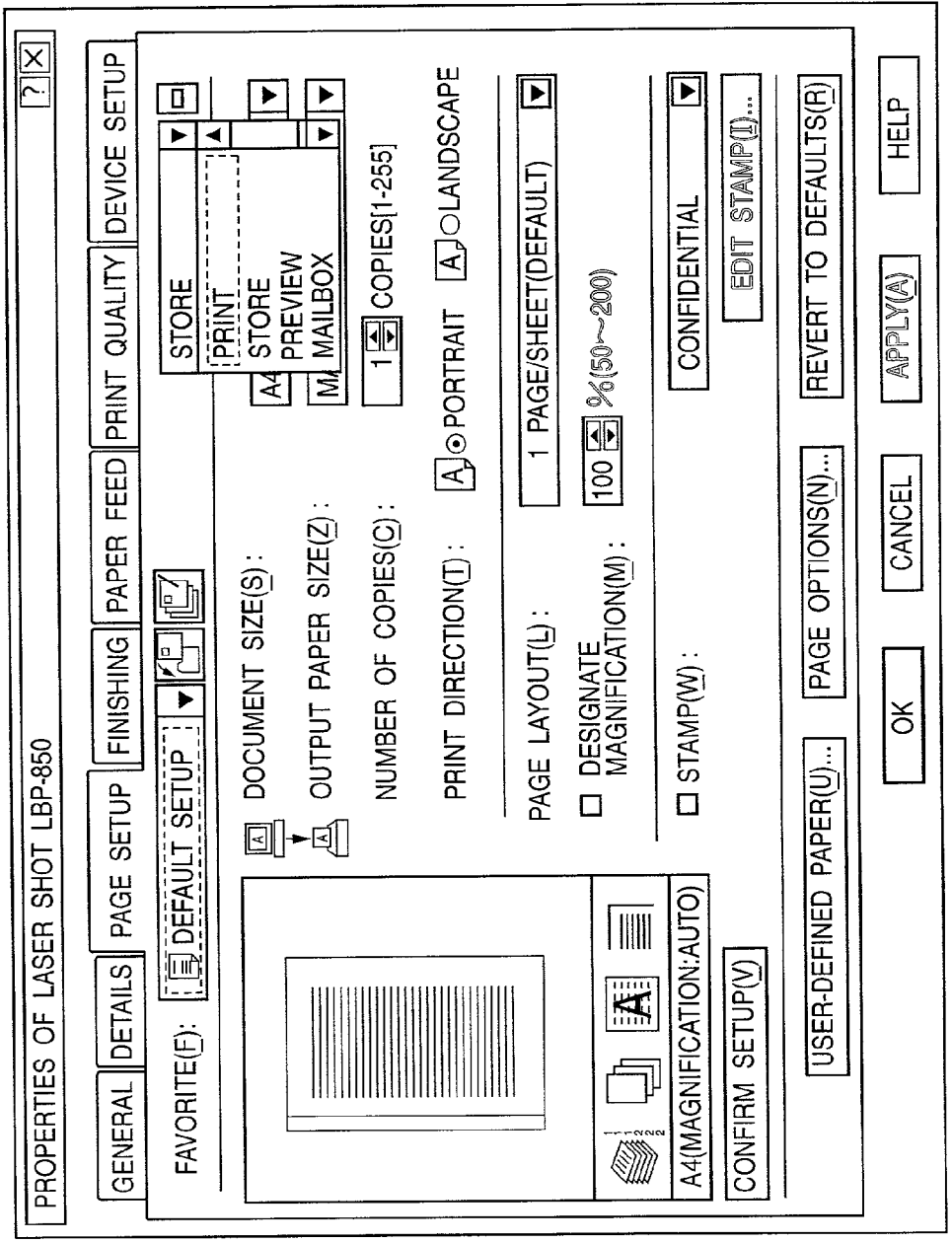
FIG. 9 shows an example of a print spool setup window.

When the user wants to combine print jobs, he or she calls the printer driver 203 from the application 201, and selects "store" from the user interface shown in FIG. 9. With this selection, the print job is stored in the spool file 303 as in the above description, and the window (FIG. 16) of the spool file manager pops up, as shown in FIG. 16. The spooled job is displayed as a list on the window of the spool file manager. By repeating the same operation from the application 201, a list of a plurality of jobs is displayed on the window of the spool file manager 304.

When the user selects a plurality of jobs and designates "combine", the setup change editor 307 stored in the external memory 111 is loaded onto the RAM 102 and is instructed to display the processing setups of the first job on the list or default setups. Then, a combine setup window shown in FIG. 18 is displayed. In this embodiment, the window of the setup change editor 307 is used as the combine setup window, but a window of another module may be used.

The setup change editor 307 processes each page description file of intermediate codes included in the spool file 303 in accordance with the contents of the processing setups included in job setup information stored in the spool file 303, and outputs the processed data for all jobs designated as the combined job to its own client area using the graphic engine 202, thus outputting these jobs on the screen. In this case, small preview images of all the selected jobs can be displayed on the preview region shown in FIG. 18. Upon generating the combined job, a job output setup file that expands the job setup files of the individual jobs is generated. This job output setup file is also generated in the job edit process. That is, one job output setup file is generated for each job and also for the combined job.

In this case, images of the individual jobs may be displayed using the processing setups before they are combined, or may be displayed by changing and correcting their setups to common processing setups of the combined job. In this case, the user interface on the setup change editor 307 may have items that the printer driver 203 can set, or the user interface of the printer driver 203 itself may be called.

When the combined job and changed items are confirmed in accordance with a confirmation request on the setup change editor 307, as described above, the control shifts to the spool file manager 304. With these operations, the plurality of jobs selected previously are displayed as a single combined job on the window of the spool file manager. When the user wants to print in accordance with the changed setup contents as in confirmation on the previewer 306, the spool file manager 304 issues a print request. The print request is sent to the graphic engine 202, and a print command is sent to the printer driver 203 via the dispatcher 301, thus executing the print process.

Figure 4:
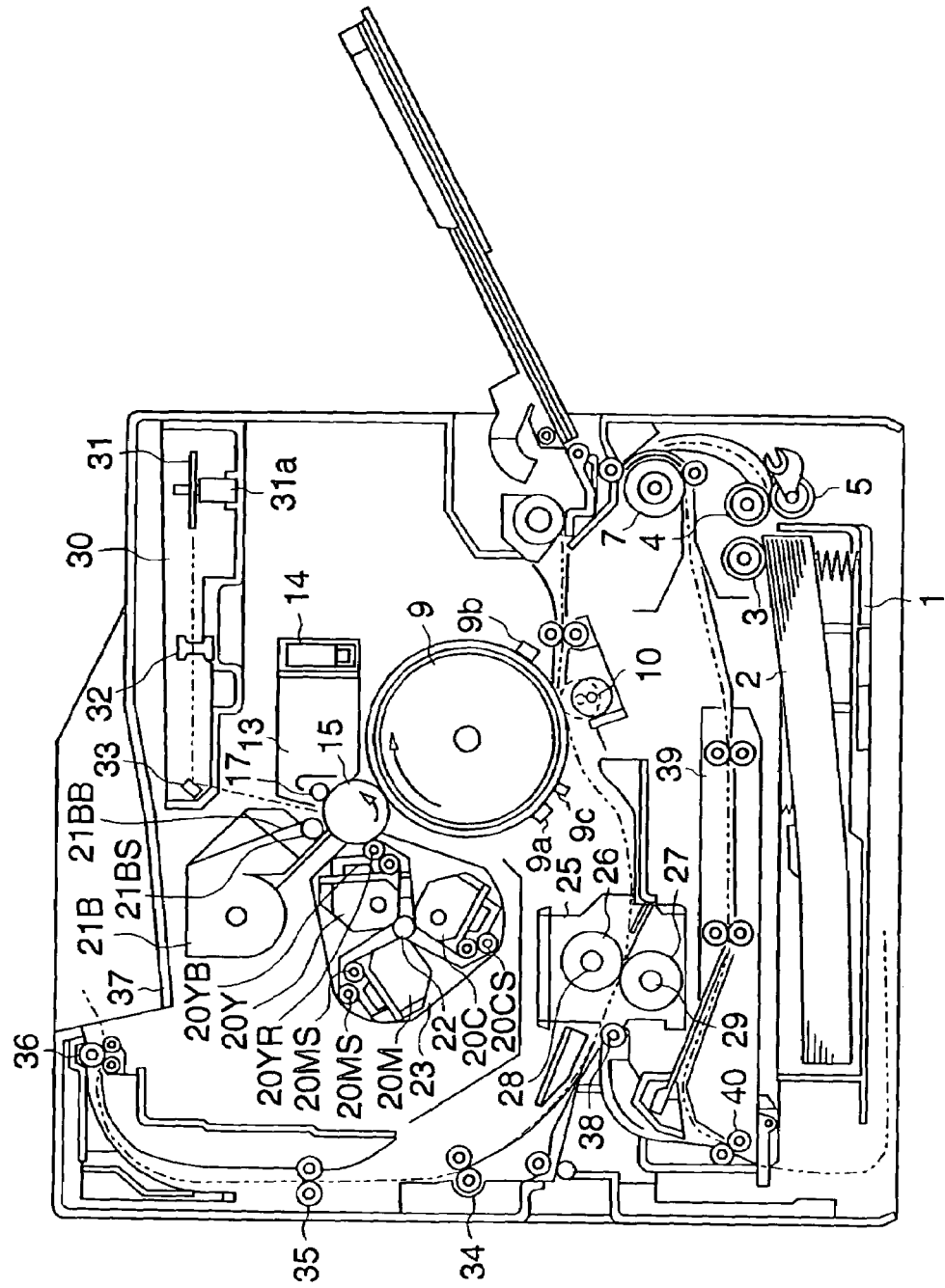
FIG. 4 is a sectional view for explaining a printer used in the present invention.

FIG. 4 is a sectional view of a color laser printer having a two-sided print function as an example of the printer 1500. This printer forms an electrostatic latent image by scanning the surface of a photosensitive drum 15 with a laser beam modulated by image data of each color obtained based on print data input from the host computer 3000 by a polygonal mirror 31. The electrostatic latent image is developed by toner to obtain a visible image, and visible images of all colors are transferred in turn onto an intermediate transfer drum 9 to form a color visible image. The color visible image is transferred onto a transfer medium 2, thus fixing the color visible image on the transfer medium 2. An image forming unit that makes the aforementioned control comprises a drum unit 13 having the photosensitive drum 15, a primary charger having a contact charging roller 17, a cleaning unit, a developing unit, the intermediate transfer drum 9, a paper feed unit including a paper cassette 1 and various rollers 3, 4, 5, and 7, a transfer unit including a transfer roller 10, and a fixing unit 25.

The drum unit 13 integrates the photosensitive drum (photosensitive body) 15 and a cleaner container 14 which has a cleaning mechanism that also serves as a holder of the photosensitive drum 15. The drum unit 13 is detachably supported on a printer main body, and is easily exchanged as a unit in correspondence with the service life of the photosensitive drum 15. The photosensitive drum 15 is prepared by applying an organic photoconductor layer on the outer surface of an aluminum cylinder, and is rotatably supported by the cleaner container 14. The photosensitive drum 15 rotates upon receiving the driving force of a driving motor (not shown), and the driving motor rotates the photosensitive drum 15 counterclockwise in accordance with image forming operation. An electrostatic latent image is formed by selectively exposing the surface of the photosensitive drum 15. In a scanner unit 30, a modulated laser beam is reflected by the polygonal mirror 31 which rotates by a motor 31a in synchronism with the horizontal sync signal of an image signal, and strikes the photosensitive drum via a lens 32 and reflection mirror 33.

The developing unit comprises three color developers 20Y, 20M, and 20C for developing yellow (Y), magenta (M), and cyan (C) images, and a single black developer 21B for developing a black (B) image. The color developers 20Y, 20M, and 20C and the black developer 21B respectively have sleeves 20YS, 20MS, 20CS, and 21BS, and coating blades 20YB, 20MB, 20CB, and 21BB which are in press contact with the outer surfaces of these sleeves 20YS, 20MS, 20CS, and 21BS. Also, the three color developers 20Y, 20M, and 20C respectively have coating rollers 20YR, 20MR, and 20CR.

The black developer 21B is detachably attached to the printer main body, and the color developers 20Y, 20M, and 20C are detachably attached to a developing rotary 23 which rotates about a rotation shaft 22.

The sleeve 21BS of the black developer 21B is set to have a gap as small as, e.g., 300 µm with respect to the photosensitive drum 15. In the black developer 21B, toner is fed by a feed member built in the developer, and is applied by the coating blade 21BB to the outer surface of the sleeve 21BS which rotates clockwise, thus charging the toner by triboelectrification. By applying a developing bias to the sleeve 21BS, the photosensitive drum 15 undergoes development in accordance with an electrostatic latent image, thus forming a visible image on the photosensitive drum 15 by black toner.

The three color developers 20Y, 20M, and 20C rotate upon rotation of the developing rotary 23 in image formation, and a predetermined one of the sleeves 20YS, 20MS, and 20CS faces the photosensitive drum 15 to have a gap as small as 300 µm. In this manner, a predetermined one of the color developers 20Y, 20M, and 20C stops at the developing position where it faces the photosensitive drum 15, thus forming a visible image on the photosensitive drum 15.

Upon forming a color image, the developing rotary 23 rotates once per rotation of the intermediate transfer drum 9 to execute developing processes in the order of the yellow developer 20Y, magenta developer 20M, cyan developer 20C, and black developer 21B. After four rotations of the intermediate transfer drum 9, visible images are formed in turn by yellow, magenta, cyan, and black toners, thus forming a full-color visible image on the intermediate transfer drum 9.

The intermediate transfer drum 9 contacts the photosensitive drum 15 and rotates upon rotation of the photosensitive drum 15. The drum 9 rotates clockwise upon forming a color image, and four visible images are transferred in turn onto the drum 9 from the photosensitive drum 15. The transfer roller 10 (to be described later) contacts the intermediate transfer drum 9 upon forming an image, and clamps and conveys a transfer medium 2, thus simultaneously transferring a color visible image on the intermediate transfer roller 9 onto the transfer medium 2. A TOP sensor 9a and RS sensor 9b for detecting the position of the intermediate transfer drum 9 in its rotational direction, and a density sensor 9c for detecting the density of the toner image transferred onto the intermediate transfer drum are arranged around the intermediate transfer drum.

The transfer roller 10 comprises a transfer charger which is supported to be movable toward or away from the photosensitive drum 15, and is prepared by winding a middle-resistance foamed elastic member around a metal shaft. The transfer roller 10 is located at its lower position, as indicated by the solid line in FIG. 4, so as not to disturb color visible images, while color visible images are transferred in turn onto the intermediate transfer drum 9. After the four color visible images are formed on the intermediate transfer drum 9, the transfer roller 10 moves to its upper position indicated by the dotted line in FIG. 1 by a cam member (not shown) in synchronism with the transfer timing of the formed full-color visible image onto the transfer medium 2. In this manner, the transfer roller 10 is brought into press contact with the intermediate transfer drum 9 at a predetermined pressure via the transfer medium 2, and is applied with a bias voltage, thus transferring the full-color visible image on the intermediate transfer drum 9 onto the transfer medium 2.

The fixing unit 25 fixes the transferred full-color visible image while conveying the transfer medium 2, and comprises a fixing roller 26 for heating the transfer medium 2, and a pressing roller 27 for pressing the transfer medium 2 against the fixing roller 26. The fixing roller 26 and pressing roller 27 are formed into a hollow shape, and respectively incorporate heaters 28 and 29. That is, the transfer medium 2 that holds the full-color visible image is conveyed by the fixing roller 26 and pressing roller 27, and the toner image is fixed on its surface by applied heat and pressure. After the visible image is fixed, the transfer medium 2 is exhausted onto an exhaust unit 37 via exhaust rollers 34, 35, and 36, thus ending the image forming operation.

The cleaning means cleans any residual toner on the photosensitive drum 15 and intermediate transfer drum 9, and waste toner after the toner image formed on the photosensitive drum 15 is transferred onto the intermediate transfer drum 9 or waste toner after the four color visible images formed on the intermediate transfer drum 9 are transferred onto the transfer medium 2 is stored in the cleaner container 14.

The transfer medium (recording sheet) 2 which is to undergo a print process is picked up from the paper tray or cassette 1 by the roller 3, and is conveyed while being clamped between the intermediate transfer roller 9 and transfer roller 10 to record a color toner image thereon. The toner image is fixed when the transfer medium 2 passes through the fixing unit 25. A guide 38 forms a convey path to guide the recording sheet toward the upper exhaust unit in a one-sided print process, but forms a path to guide it to a lower two-side unit in a two-sided print process.

The recording sheet guided to the two-side unit is temporarily fed to a portion (a convey path indicated by the two-dashed chain line) below the tray 1 by convey rollers 40, is then conveyed in the reverse direction, and is fed to a two-side tray 39. On the two-side tray 39, the paper sheet is upside down with respect to that placed on the paper tray 1, and its convey direction is reversed. In this state, a toner image is transferred and fixed again, thus achieving the two-sided print process.

Figure 5:
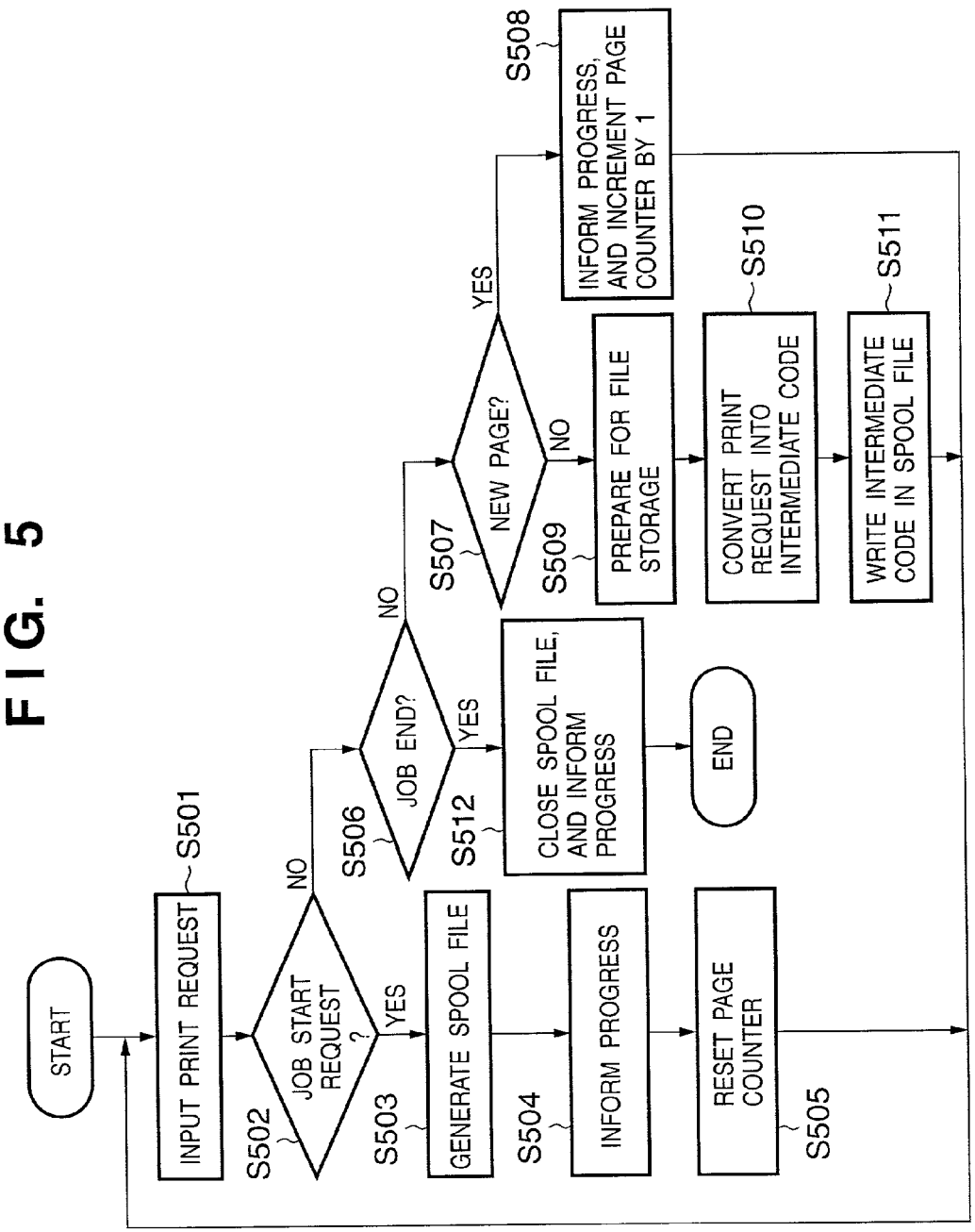
FIG. 5 is a flow chart showing the process in a spooler 302.
Figure 8:
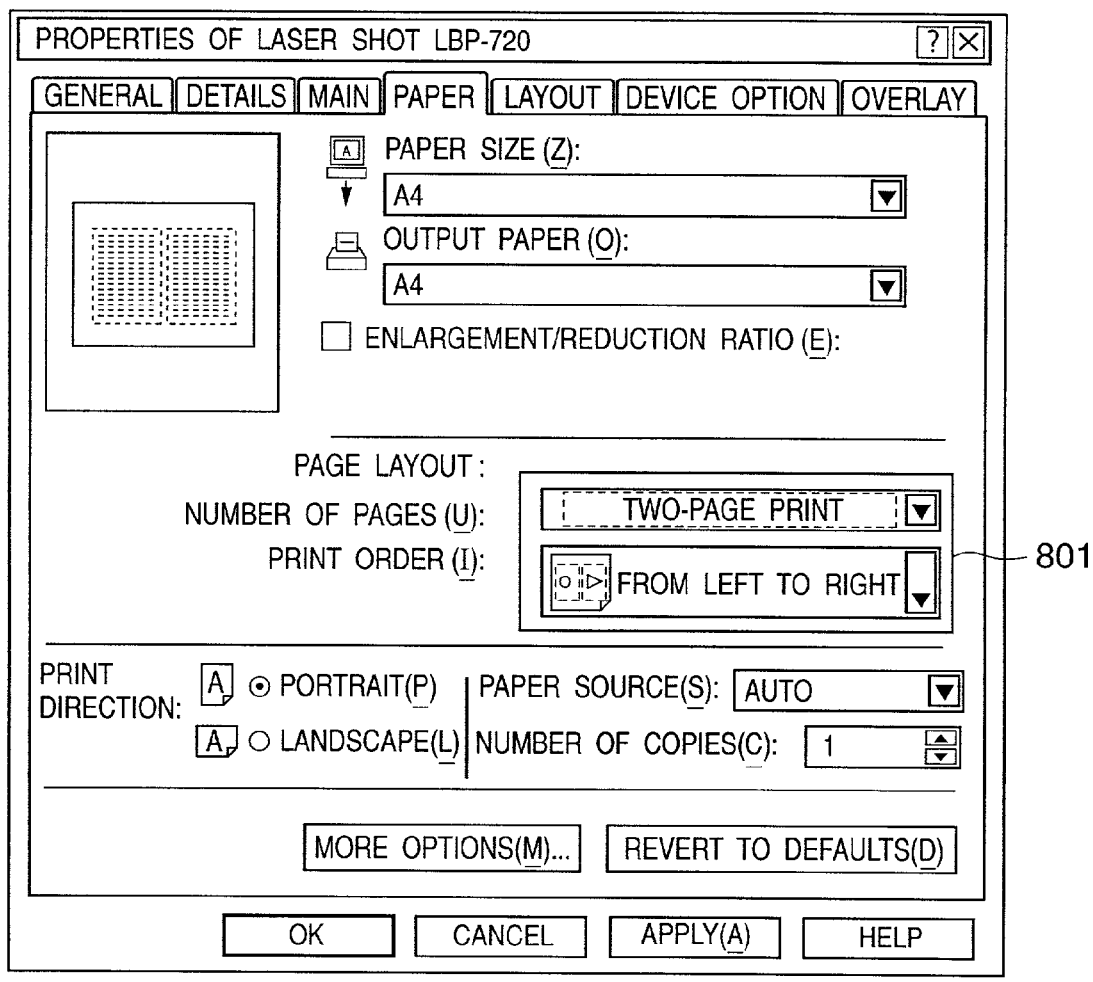
FIG. 8 shows an example of a print setup window.

FIG. 5 is a flow chart showing the processing in the step of saving for respective pages upon generating the spool file 303 in the spooler 302. In step S501, the spooler 302 receives a print request from the application via the graphic engine 202. The application displays a dialog that prompts the user to input print setups, as shown in FIG. 8, and the print setups input on this dialog are passed from the printer driver to the spooler 303. The setup input dialog shown in FIG. 8 includes a setup item 801 that determines the number of logical pages to be laid out per physical page, and the like.

In step S502, the spooler 302 checks if the received print request is a job start request. If it is determined in step S502 that the received print request is a job start request, the flow advances to step S503, and the spooler 302 generates a spool file 303 for temporarily saving intermediate data. Subsequently, the spooler 302 informs the spool file manager 304 of the progress of the print process in step S504, and resets its page counter to 1 in step S505. The spool file manager 304 reads and stores information, processing setups, and the like of a job, the print process of which has started, from the spool file 303.

On the other hand, if it is determined in step S502 that the received print request is not a job start request, the flow advances to step S506. The spooler 302 checks in step S506 if the received request is a job end request. If it is determined that the received request is not a job end request, the flow advances to step S507 to check if the received request is a new page request. If it is determined in step S507 that the received request is a new page request, the flow advances to step S508 to inform the spool file manager 304 of the progress of the print process. The spooler 302 then increments the page counter, closes a page description file that stores intermediate codes, and generates the next page description file.

If it is determined in step S507 that the received print request is not a new page request, the flow advances to step S509, and the spooler 302 prepares for export of intermediate codes to a page description file. In step S510, the spooler 302 converts a DDI function of the print request into intermediate codes to store the print request in the spool file 303. In step S511, the spooler 302 writes the print request (intermediate codes) that has been converted into a storable format in a page description file of the spool file 303 in step S510. After that, the flow returns to step S501 to receive a print request from the application again. The spooler 302 repeats a series of processes from steps S501 to S511 until it receives a job end request (End Doc). The spooler 302 simultaneously acquires information such as processing setups and the like stored in the DEVMODE structure from the printer driver 203, and stores such information in the spool file 303 as a job setup file.

On the other hand, if it is determined in step S506 that the print request from the application is a job end request, since the spooler 302 has received all print requests from the application, the flow advances to step S512 to inform the spool file manager 304 of the progress of the print process, thus ending the processing.

Figure 6:
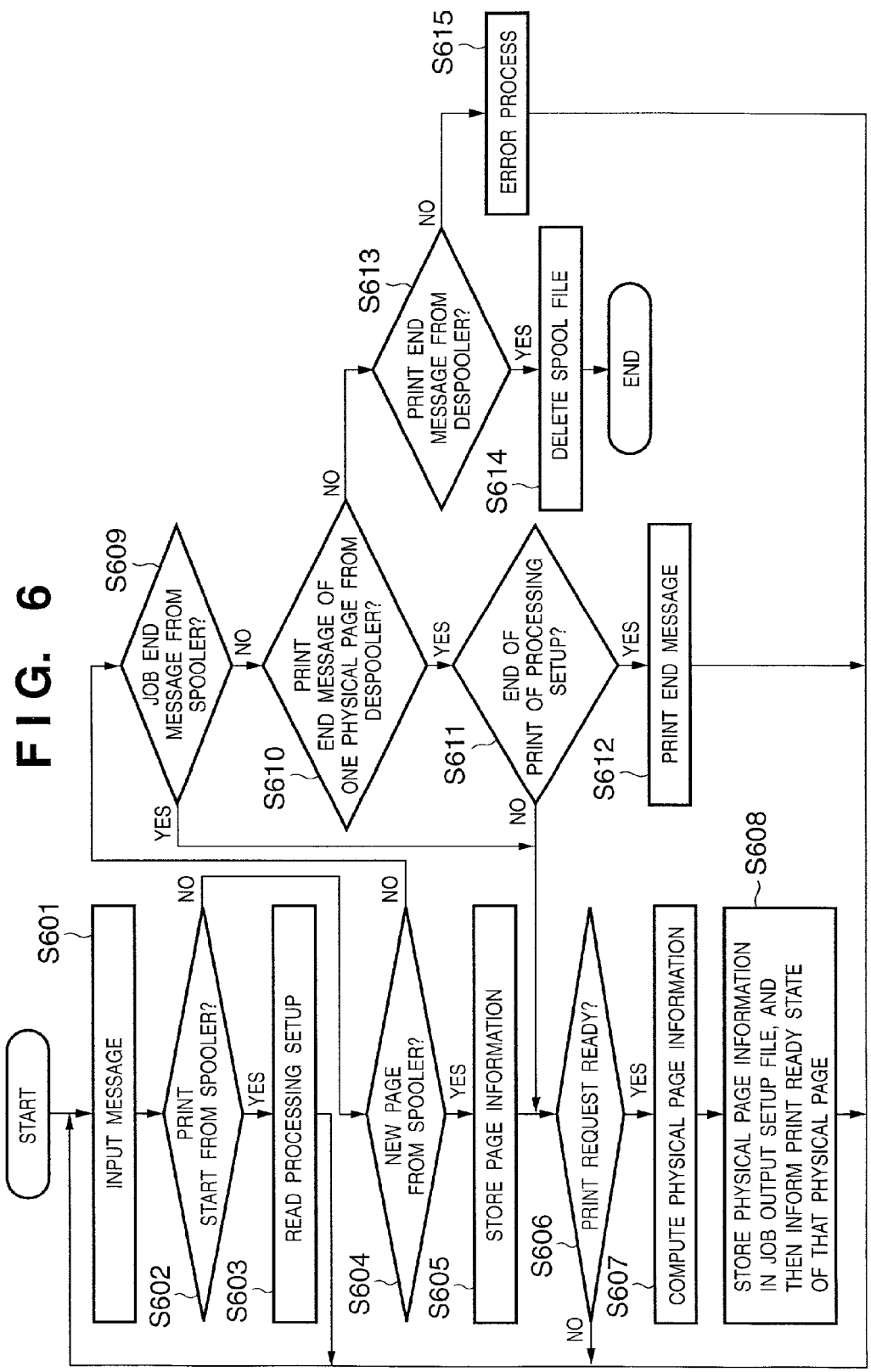
FIG. 6 is a flow chart showing print control in a spool file manager 304.

FIG. 6 is a flow chart showing details of control between the spool file 303 generation process and a print data generation process (to be described later) in the spool file manager 304. In step S601 in FIG. 6, the spool file manager 304 receives a print process progress message from the spooler 302 or despooler 305. The spool file manager 304 checks in step S602 if the progress message is a print start message which is sent from the spooler 302 in step S504 described above. If YES in step S602, the flow advances to step S603, and the spool file manager 304 reads the print processing setups from the spool file 303 to start job management.

On the other hand, if it is determined in step S602 that the received progress message is not a print start message from the spooler 302, the flow advances to step S604, and the spool file manager 304 checks if the progress message is a print end message of one logical page which is sent from the spooler 302 in step S508 mentioned above. If the progress message is a print end message of one logical page, the flow advances to step S605 to store logical page information for that logical page. It is then checked in step S606 if a print process of n logical pages that have been spooled at that time onto one physical page can start. If YES in step S606, the flow advances to step S607 to determine a physical page number on the basis of the number of logical pages assigned to one physical page to be printed.

As for a computation of a physical page, for example, when the processing setups lay out four logical pages on one physical page, the first physical page becomes ready for printing when the fourth logical page has been spooled, thus determining the first physical page. Subsequently, the second physical page becomes ready for printing when the eighth logical page has been spooled. Also, even when the total number of logical pages is not a multiple of the number of logical pages to be laid out per physical page, logical pages to be laid out per physical page can be determined by a spool end message in step S512.

In step S608, the spool file manager 304 saves information such as the logical page numbers which form the physical page that is ready for printing, the physical page number of that physical page, and the like in a job output setup file (a file including physical page information) in the format shown in FIG. 10, and informs the despooler 305 that physical page information for one physical page has been added. After that, the flow returns to step S601 to wait for the next message. In this embodiment, when print data for one page, i.e., logical pages that form one physical page have been spooled, a print process can start even when print jobs to be spooled still remain.

On the other hand, if it is determined in step S604 that the progress message is not a print end message of one logical page, the flow advances to step S609, and the spool file manager 304 checks if the progress message is a job end message sent from the spooler 302 in step S512 mentioned above. If YES in step S609, the flow advances to step S606 described above. On the other hand, if the progress message is not a job end message, the flow advances to step S610, and the spool file manager 304 checks if the received message is a print end message of one physical page from the despooler 305. If the received message is a print end message of one physical page, the flow advances to step S611 to check if print processes for the processing setups are complete. If YES in step S611, the flow advances to step S612 to send a print end message to the despooler 305.

On the other hand, if it is determined that print processes for the processing setups are not complete yet, the flow advances to step S606 described above. The despooler 305 in this embodiment assumes one physical page as a unit for the print process. In step S608, information required for executing the print process of one physical page is saved in a file, so that such information can be used again. However, if such information need not be used again, a high-speed medium such as a shared memory or the like may be used to overwrite information in turn for respective physical pages, thus achieving both high processing speed and resource savings. On the other hand, when the progress of spooling is faster than that of despooling, or when despooling starts after completion of spooling of all pages, a message indicating that a plurality of physical pages or all physical pages are ready for print is sent in accordance with the progress on the despooling side in place of sending a page print ready message for each physical page in step S608, thus reducing the number of messages.

If it is determined in step S610 that the message is not a print end message of one physical page from the despooler 305, the flow advances to step S613, and the spool file manager 304 checks if the message is a print end message from the despooler 305. If it is determined that the message is a print end message from the despooler 305, the flow advances to step S614, and the spool file manager 304 deletes the corresponding page description files in the spool file 303, thus ending the processing. On the other hand, if the message is not a print end message from the despooler 305, the flow advances to step S615 to execute another normal process and to then wait for the next message.

Figure 7:
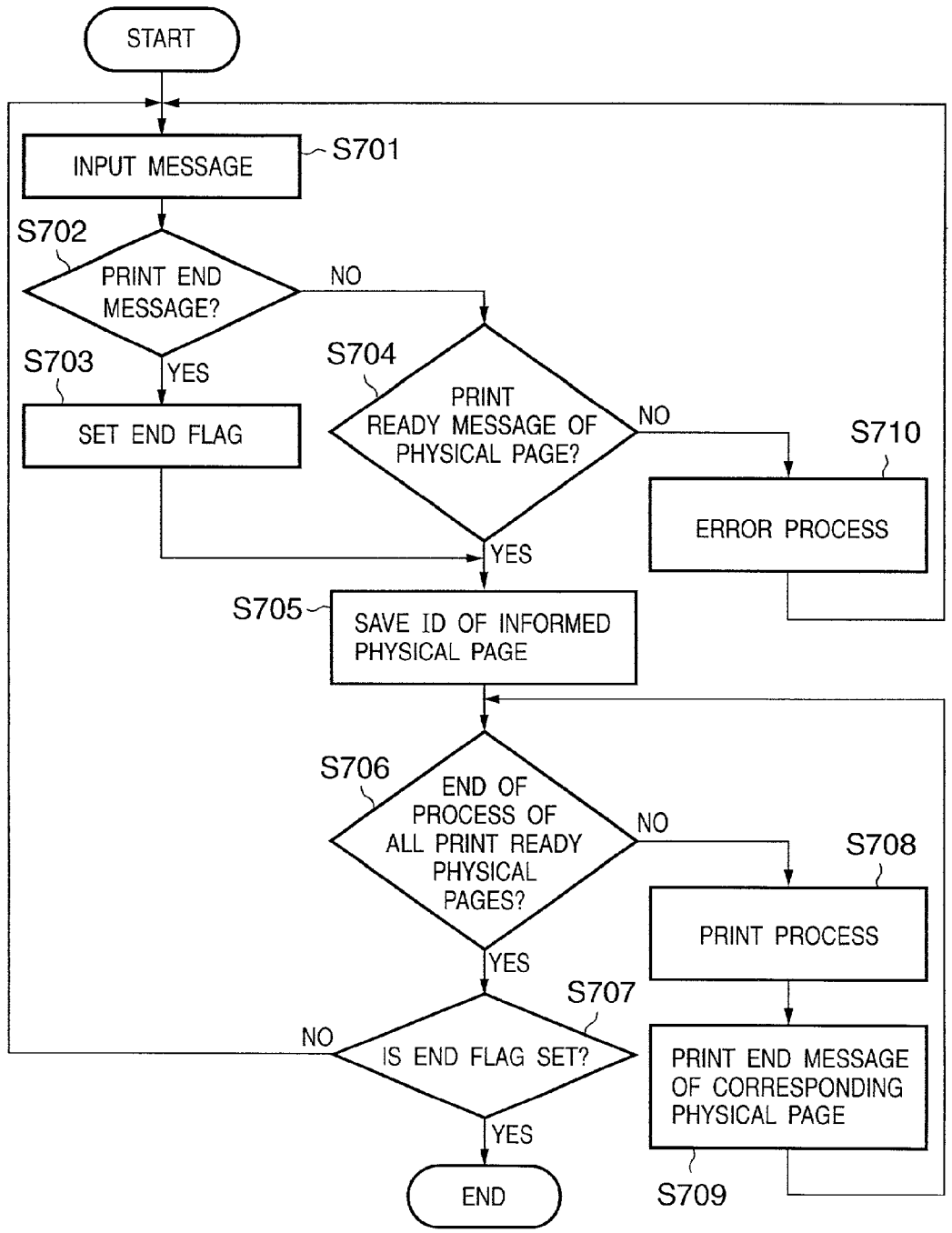
FIG. 7 is a flow chart showing the process in a despooler 305.

FIG. 7 is a flow chart showing details of the print data generation process in the despooler 305. In FIG. 7, the despooler 305 reads out required information (page description file and job setup file) from the spool file 303 in response to the print request from the spool file manager 304, and generates print data. The method of transferring the generated print data to the printer has already been explained with reference to FIG. 3.

Upon generating print data, the despooler 305 receives a message from the spool file manager 304 in step S701. The despooler 305 checks in step S702 if the input message is a job end message. If YES in step S702, the flow advances to step S703 to set an end flag, and the flow then jumps to step S705. On the other hand, if it is determined in step S702 that the received message is not a job end message, the flow advances to step S704 to check if the print start request of one physical page in step S608 mentioned above is received. If it is determined in step S704 that the received message is not a start request, the flow advances to step S710 to execute an error process, and the flow returns to step S701 to wait for the next message.

On the other hand, if it is determined in step S704 that the received message is a print start request of one physical page, the flow advances to step S705, and the despooler 305 saves the IDs of physical pages, the print ready message of which was received in step S704. The despooler 305 checks in step S706 if print processes of all pages of the physical page IDs saved in step S705 are complete. If YES in step S706, the flow advances to step S707 to check if the end flag was set in step S703 mentioned above. If YES in step S707, the despooler 305 determines that the job print process is complete, and sends its processing end message to the spool file manager 304, thus ending the processing. If it is determined in step S707 that the end flag is not set, the flow returns to step S701 to wait for the next message.

If it is determined in step S706 that physical pages which are ready for print still remain, the flow advances to step S708. In step S708, the despooler 305 reads out unprocessed physical page IDs in turn from the saved physical page IDs, reads information required for generating print data of a physical page corresponding to each readout physical page ID, and executes a print process. The print process is done by converting by the despooler 305 a print request command stored in the spool file 303 into a format (GDI function) that the graphic engine 202 can recognize, and transferring it to the printer driver.

As for the processing setups that lay out a plurality of logical pages on one physical page (to be referred to as an N-page print process hereinafter) as in this embodiment, conversion is done in consideration of the layout upon reduction in scale. Upon completion of the required print process, the despooler 305 sends a print data generation end message of one physical page to the spool file manager 304 in step S709. The flow returns to step S706 to repeat the aforementioned processes until print processes for all the physical page IDs of print ready pages, which were saved in step S705, are complete.

The flow of the print process using the dispatcher 301, spooler 302, spool file manager 304, and despooler 305 has been explained. With the above process, since the application 201 is released from the print process at the timing at which the spooler 302 generates intermediate codes and stores them in the spool file 303, the application 201 can be released earlier than a case wherein a print command is directly output to the printer driver 203. Since intermediate files (page description file, job setup file) that consider the print setups of the printer driver are temporarily saved in the spool file 303, the user can recognize a print preview of an image to be actually printed, and can combine or sort print jobs generated by a plurality of applications. Also, the user can change print setups to execute a print process without launching the application again.

In the print process using the spooler 302, a job output setup file is generated when the despooler 305 issues a print request to the graphic engine 202, and is also generated when the preview process, job combine process, or the like is done. The job output setup file is equivalent to a job setup file in case of an independent job, and is generated based on a plurality of pieces of job setup information in case of a combined job. The job output setup file will be explained below.

FIG. 10 shows an example of the job output setup file that saves information which is generated by the spool file manager 304 in step S608, and forms a print ready physical page. A field 1001 holds an ID that identifies a job, and may be held in the form of the name of a file or shared memory which saves this information. A field 1002 stores job setup information. The job setup information includes information unique to each job, such as a structure required for starting a job print process with respect to the graphic engine 202, designation of an N-page print process, designation of additional rendering of a page frame or the like, the number of copies, finishing designation such as staple, and the like. The job setup information in the field 1002 saves a required number of pieces of information in correspondence with the functions for a job. A field 1003 stores the number of physical pages of a job, and indicates the number of pieces of physical page information in correspondence with the value stored therein. Since this embodiment informs the number of physical pages which are ready for print, this field may be omitted. Fields 1004 to 1007 store physical page information in correspondence with the value stored in the field 1003. The physical page information will be explained later using FIG. 12.

FIG. 11 shows an example of the job setup information in the field 1002 shown in FIG. 10. A field 1101 stores the total number of physical pages. A field 1102 stores the total number of logical pages. The fields 1101 and 1102 are used when the number of pages is printed as additional information in addition to print data. While a print process continues, these fields store tentative values, or the spool file manager 304 postpones generation of information of print ready physical pages until the print process ends. A field 1103 stores information indicating the number of copies to be printed of the print job of interest. A field 1104 stores information that designates if a print process is done for respective copy sets, when information set in the field 1103 indicates a print process of a plurality of sets of copies. A field 1105 stores finishing information such as staple, punch, Z-fold, and the like, which information is designated when a finisher is available on the printer main body or an external device. A field 1106 stores additional print information, which saves information to be added to a job such as decoration including a page frame or the like, additional information including a date or the like, the user name, the number of pages, watermark print, and the like. The number of fields included in this job setup information increases with increasing number of functions. For example, when a two-sided print function is available, a field for saving designation of two-sided print is added.

Figure 12:
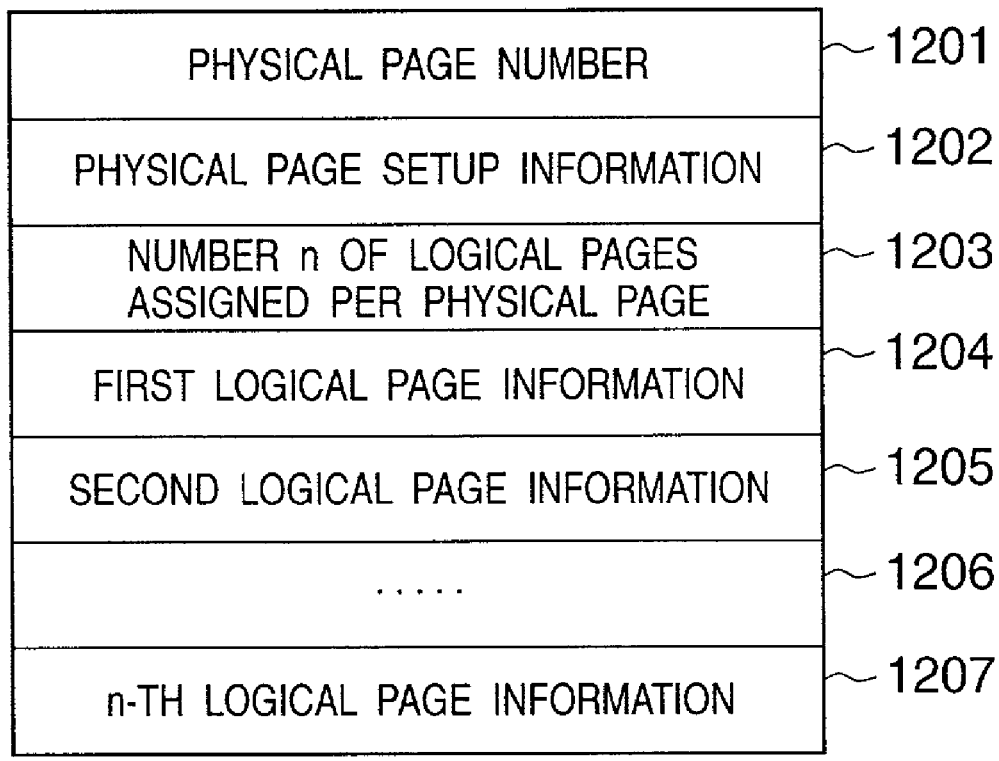
FIG. 12 shows an example of physical page information in a field 1004 shown in FIG. 10.

FIG. 12 shows an example of the physical page information in the field 1004 shown in FIG. 10. A first field 1201 stores a physical page number, which is a value used when the print order is managed or a physical page number is additionally printed. A field 1202 stores physical page setup information, which saves layout or color/monochrome setups when a layout or color/monochrome mode can be designated for respective physical pages. A field 1203 stores the number of logical pages assigned to the physical page of interest, and saves a value "4" or an ID indicating 4-page print when four pages are assigned per physical page. A field 1204 and the subsequent fields save information of logical pages in correspondence with the number designated in the field 1203. Depending on the number of pages printed from the application 201, the actual number of page data sometimes becomes smaller than the number of pages designated by the field 1203. In such case, logical page information saves special data indicating a blank page.

Figure 13:
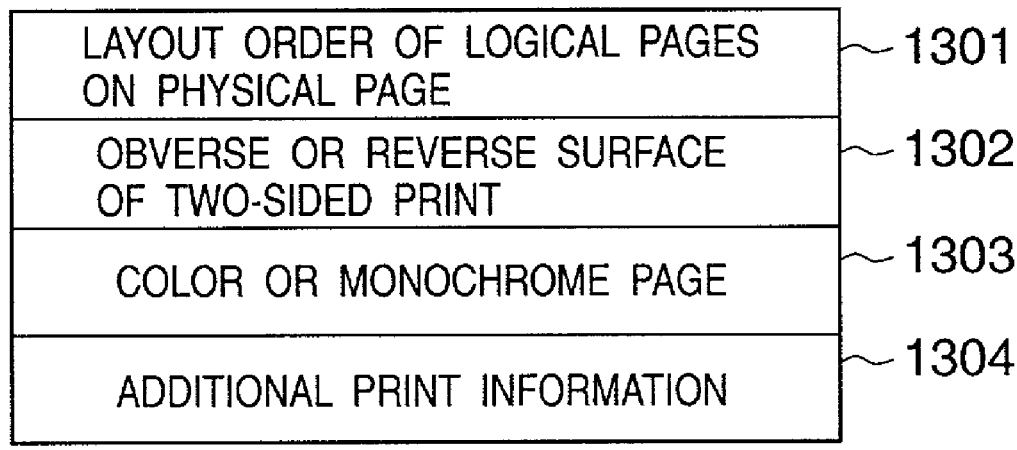
FIG. 13 shows an example of physical page setup information in a field 1202 in FIG. 12.

FIG. 13 shows an example of the physical page setup information in the field 1202. A field 1301 stores the layout order of logical pages on a physical page, and saves designation of the order that logical pages are laid out on a physical page (from upper left to right, from upper left to lower, and the like) in an N-page print process. In some systems, the field 1204 and the subsequent fields that store logical page information may be arranged not in a page number order but in the layout order in place of the setups in the field 1301. A field 1302 stores information indicating the obverse or reverse surface of the two-sided print, which is used when, e.g., binding margins are to be formed on identical sides on the obverse and reverse surfaces.

A field 1303 stores designation of a color or monochrome page, which is a value used when a printer has both monochrome and color modes, and color and monochrome pages of a document that includes both color and monochrome pages are to be printed in the color and monochrome modes, respectively. With this information, the color printer can change processes for respective pages as an auto color mode. That is, transfer control is done for a color page by completing rotations of an intermediate transfer member (intermediate transfer drum or belt) or transfer member (transfer drum or belt) in correspondence with the number of device colors (four rotations in case of YMCK), and for a monochrome page by completing one rotation for black. A field 1304 stores additional print information, which is used when additional information such as the number of pages, date, or the like is printed on a physical page. In the physical setup information, the number of fields increases in correspondence with the number of functions of the system.

Figure 14:
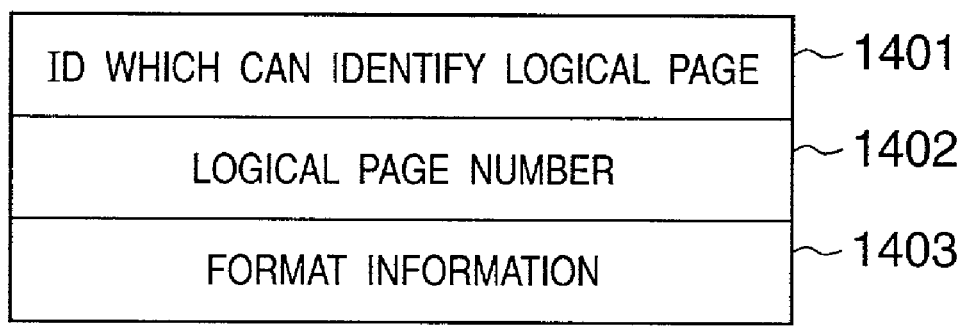
FIG. 14 shows an example of a data format to be passed when the spool file manager 304 issues a print request of a physical page to the despooler 305.

FIG. 14 shows an example of logical page information stored in the field 1204. A field 1401 stores the ID of a physical page. Using this ID, an intermediate code of a page description file corresponding to the logical page of interest is looked up from the spool file 303. This field may store a file or memory pointer, or an intermediate code itself that forms a logical page, as long as the intermediate code of a logical page can be accessed using this ID. A field 1402 stores a logical page number, which is used when the logical page number is printed as additional information or as auxiliary information of the logical page ID. Format information in a field 1403 saves various setup items that can be designated for respective logical pages. For example, the format information saves additional print information such as a page frame and various kinds of setup information designated for respective logical pages such as an enlargement/reduction ratio and the like. Also, the format information can save attribute information of a logical page such as color/monochrome information for respective logical pages if necessary. Conversely, if a system need not switch setups for respective local pages or does not require any attribute information for respective logical pages, the field 1403 can be omitted.

The job output setup file has the aforementioned configuration. Note that the job setup file has nearly the same configuration. The job setup file saves a print method (one-sided, two-sided, bookbinding print), a print layout (Nup, poster print), additional information (addition of watermark, date, user name), the number of copies, and paper size information for each job. Also, the job setup file saves the layout order of logical pages, information indicating the obverse or reverse surface of two-sided print, color mode information, and the like for respective physical pages.

Furthermore, FIG. 3 shows the example in which the setup change editor 307 having a function of changing the setups of a job is added to the expanded system described so far. In this embodiment, the setup contents of an independent job are contained in a job setup file, and those of a combined job are contained in a job output setup file shown in FIG. 10. In addition, these files are independent from the page description file that saves intermediate codes. Hence, the setups of each job can be changed by editing the job output setup file. The setup change editor 307 edits or partially rewrites the job output setup file solely or in collaboration with the spool file manager 304, thus implementing the job setup change function.

Figure 15:
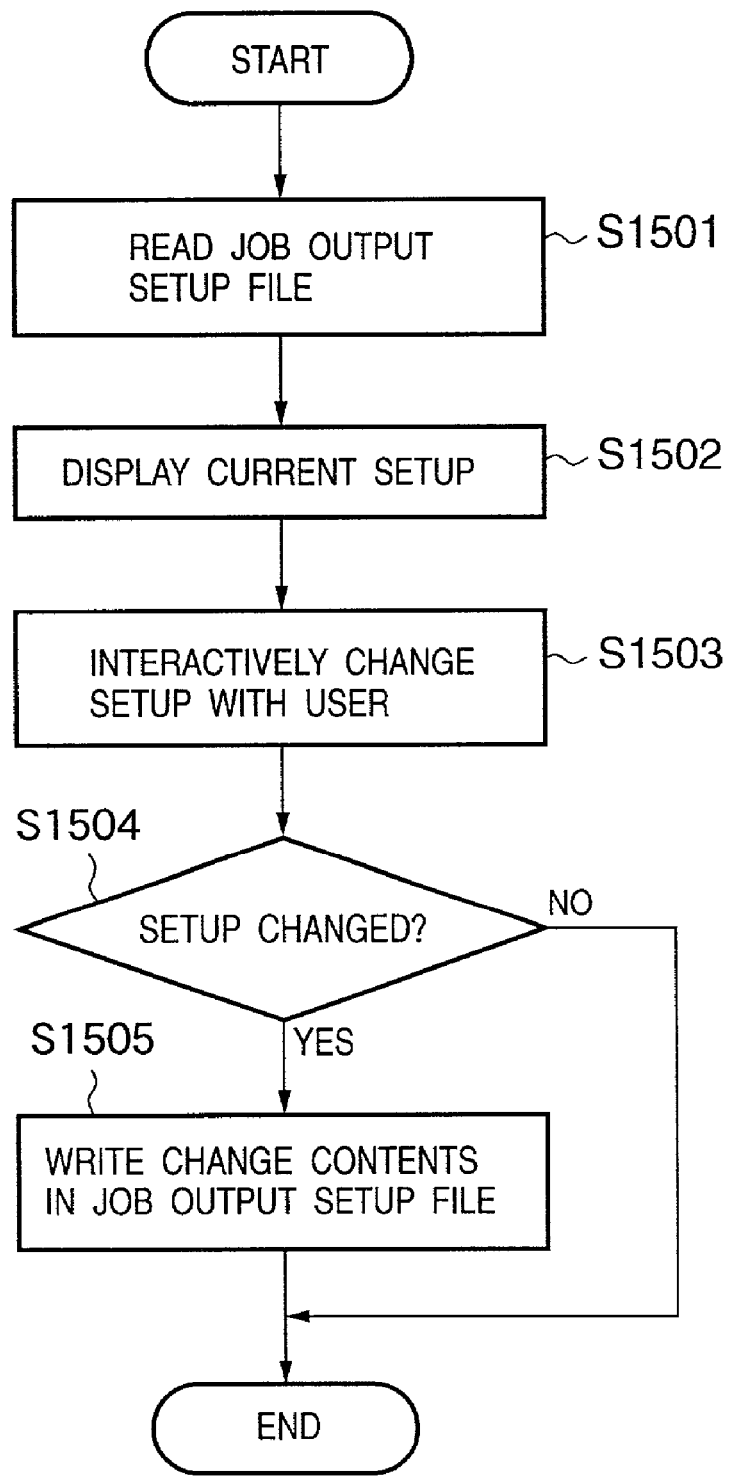
FIG. 15 is a flow chart showing a setup change process in a setup change editor 307.

FIG. 15 is a flow chart showing details of the job setup change process in the setup change editor 307. In step S1501, the setup change editor reads a job setup file or job output setup file. The job output setup file is the same file as that read by the previewer 306 and despooler 305. The flow advances to step S1502 to display the read result to the user. In step S1503, the setup change editor interactively changes the setup contents by the aforementioned menu designation and the like with the user on the user interface shown in FIG. 18. This step may be attained in a batch manner that changes contents in accordance with setup change contents written in a file or the like in place of the interactive manner.

The flow advances to step S1504, and the setup change editor compares the contents initially read in step S1501 and the currently designated setup contents to check if the contents have been changed. If the setup contents have been changed, the flow advances to step S1505 to generate a new job output setup file and inform the spool manager file of the changes, thus ending the processing. If it is determined in step S1504 that the setup changes have not been changed, the setup change editor informs the spool file manager of that fact, thus ending the processing. A new job output setup file is generated in this way. When an "OK" button is selected on the user interface window in FIG. 18, the new job output setup file is enabled, and the old job output setup file is deleted. When the job setup file of an independent job has been changed in place of the job output setup file, the old file is saved without being deleted.

When a "revert to defaults" button 1802 is selected on the window shown in FIG. 18, the new job output setup file is deleted, and the old job output setup file is enabled and reflected in display. This embodiment has explained the setup change editor 307 as an independent module. Alternatively, the setup change editor 307 may be a part of the user interface of the spool file manager 304. Also, the setup change editor 307 may be implemented as follows. That is, the editor 307 does not actually write change contents in the job output setup file and informs the spool file manager 304 of only the setup change contents, and the spool file manager 304 actually changes the job output setup file.

FIG. 3 shows the expanded system that combines a plurality of print jobs and prints them as a single print job. An expansion for despooling and previewing a combined job will be explained below.

Normally, spool files 303 with the intermediate format are generated for respective jobs. In case of an independent job, since a process is executed by sequentially reading out intermediate codes of respective logical pages in the job file to be processed, the logical page ID in the field 1401 can be implemented by a relative or absolute offset which indicates the location of each logical page in a file. In case of a combined job, a spool file and page information which belongs to that job must be specified from the job ID in the field 1401. In this embodiment, a spool file is specified by appending an ID that identifies a spool file to the logical page ID. In this case, only the field 1401 can be modified. If the spool file can be identified, reading of page information can be processed by the same logic as in the process of an independent job. In another implementation, when spool files are saved as independent files for respective logical pages, the file name of each logical page may be used as the logical page ID in the field 1401.

Figure 19:
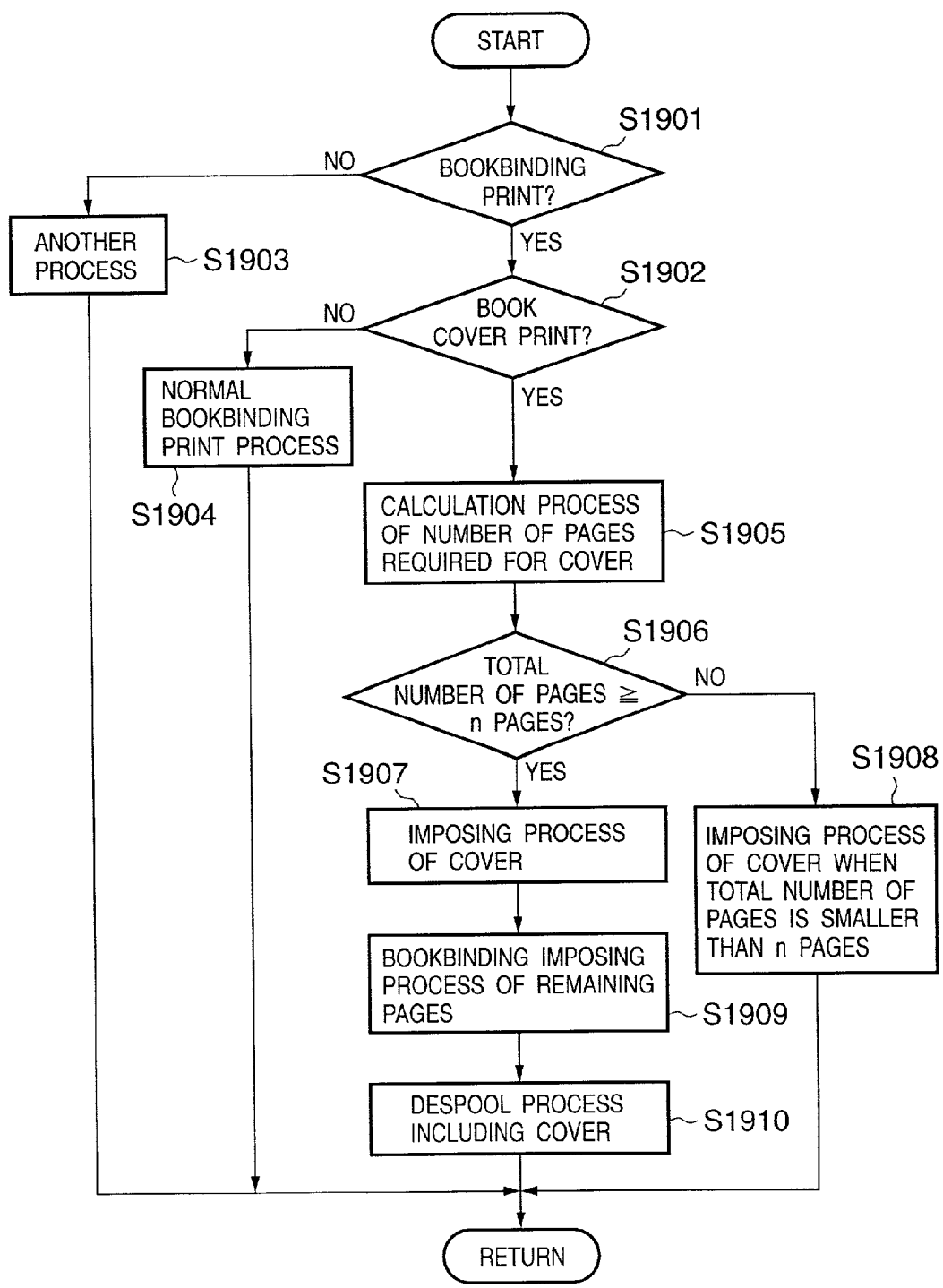
FIG. 19 is a flow chart showing the processing flow of the spool file manager 304 of the present invention.
Figure 28:
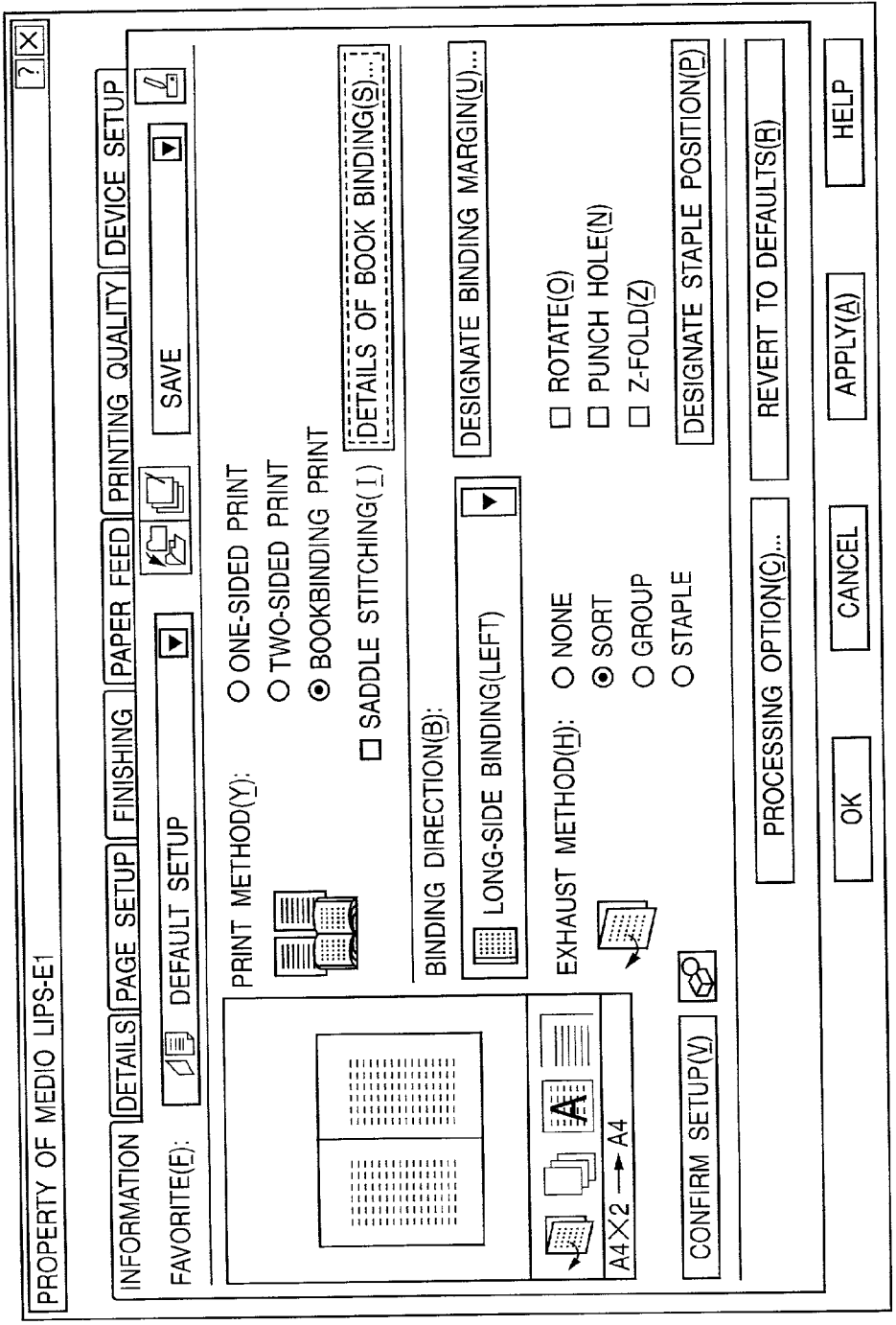
FIG. 28 shows a user interface of a driver according to the embodiment of the present invention.

FIG. 19 is a flow chart for explaining an imposing process on a cover paper sheet as a characteristic feature of the present invention. The process shown in FIG. 19 is implemented under the control of the CPU 101 of the information processing apparatus on the basis of the spool file manger 304 as a module provided by the print control program of the present invention. The processing flow of the present invention will be described using this flow chart. As described above, the spool file manager 304 loaded from the spooler 302 in a series of print processes reads a job setup file, and executes a determination process (S1901) for checking if a bookbinding print process is to be done. In this process, it is checked if the user has designated a bookbinding print process on a user interface (corresponding to "finishing sheet" on the user interface shown in FIG. 9) shown in FIG. 28 provided by the printer driver. If the user has not designated a bookbinding print process, the flow advances to step S1903 to execute a process other than the bookbinding print process. The following explanation will be given under the assumption that the bookbinding print process is designated. The processes in steps S1902 and the subsequent steps may be executed, not only when the user designates a bookbinding print process using the user interface provided in the print setup process by the printer driver before a spool file is generated, but also when the user selects "store" on the user interface shown in FIG. 9, and also designates "bookbinding print" as a print method on the user interface shown in FIG. 18, which is provided upon editing in combination with other print jobs.

Figure 29:
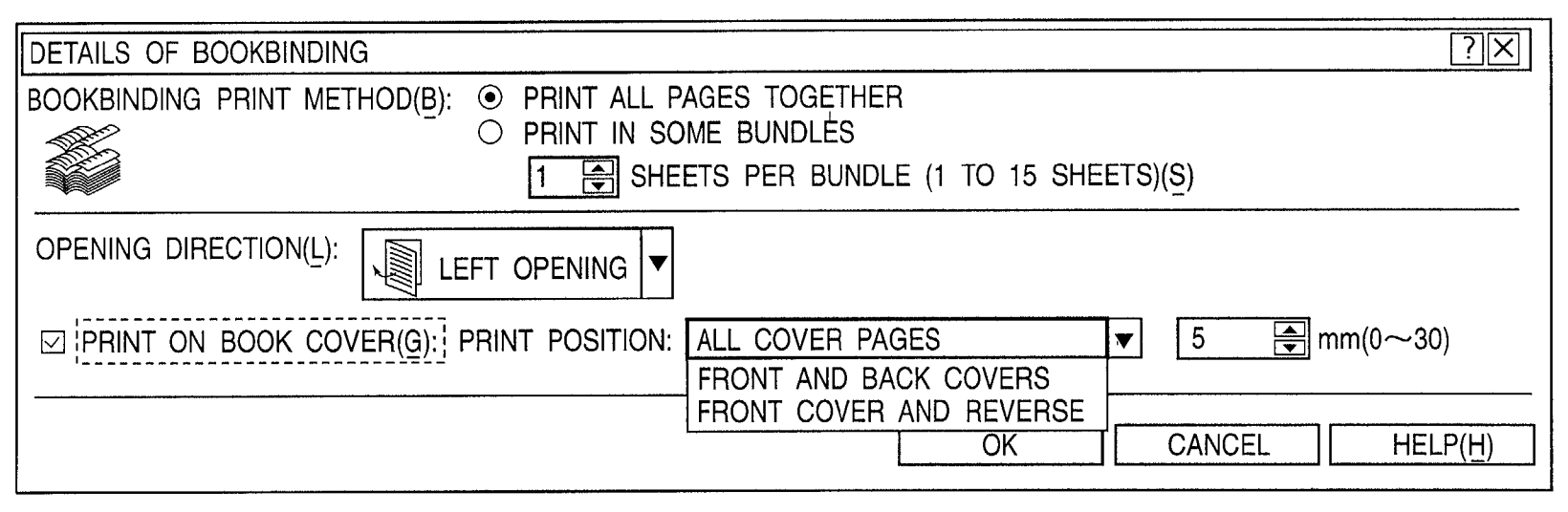

A determination process (S1902) is executed to check if a book cover print process is done. In this process, it is checked as in bookbinding print designation if the user has designated a book cover print process from the user interface of the driver. This process is done by checking if the user has designated a check box "book cover print" on a dialog box shown in FIG. 29, which opens upon designating a "bookbinding details" button on the user interface (FIG. 28) used to designate bookbinding print setups. If a book cover print process has not been designated, a normal bookbinding print process is done (S1904), and a normal imposing process for bookbinding is executed. In the following description, assume that the book cover print process has been designated.

A calculation process (S1905) for calculating the number of pages required for a cover is executed. In this process, the number of pages to be printed on a book cover is calculated. In this embodiment, assume that all of the obverse and reverse surfaces of front and back covers undergo a print process, and four pages are required. A determination process (S1906) is executed to check if the total number of pages of print data from the application is equal to or larger than n. In this process, the number of pages calculated by the calculation process (S1905) of the number of pages required for a cover is compared with that of print data from the application. In this case, it is checked if the number of pages of the print data is equal to or larger than 5. If the number of pages is equal to or larger than 5, it is determined that the first and second pages, last page—1, and last page are imposed on a cover portion; if the number of pages is smaller than 5, it is determined all logical pages output from the application are imposed on a cover portion (cover page determination process).

Figure 21:
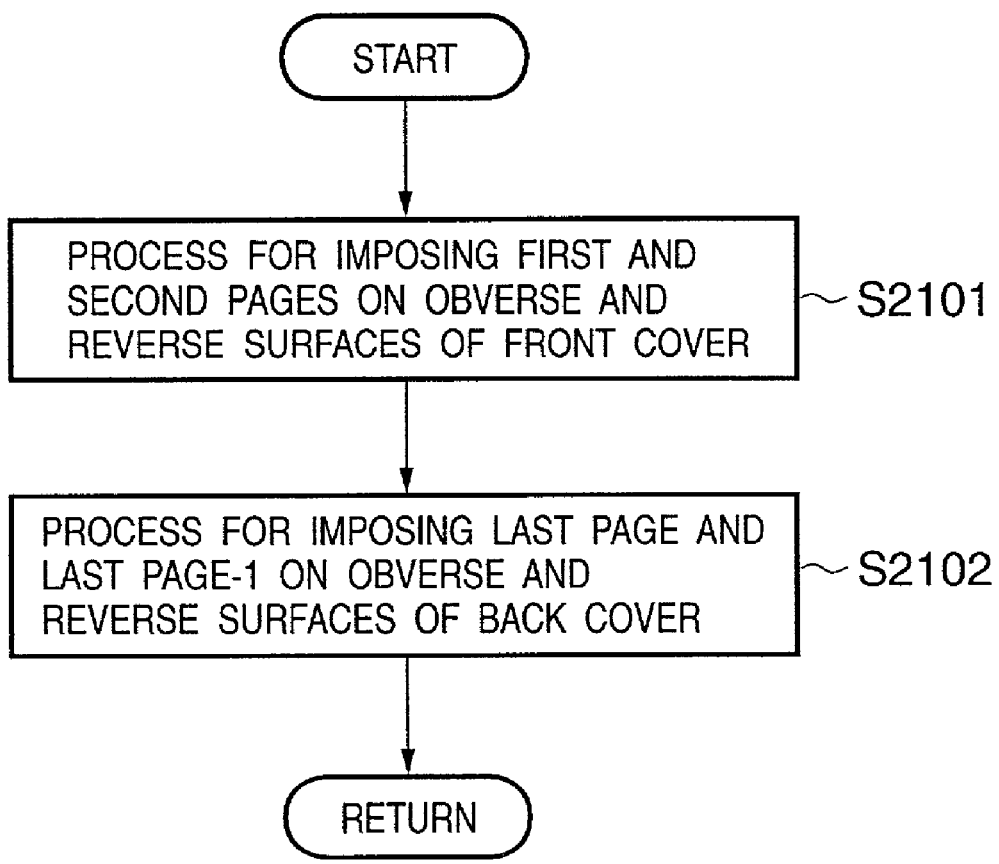
FIG. 21 is a flow chart showing the processing flow of the spool file manager 304 of the present invention.
Figure 26:
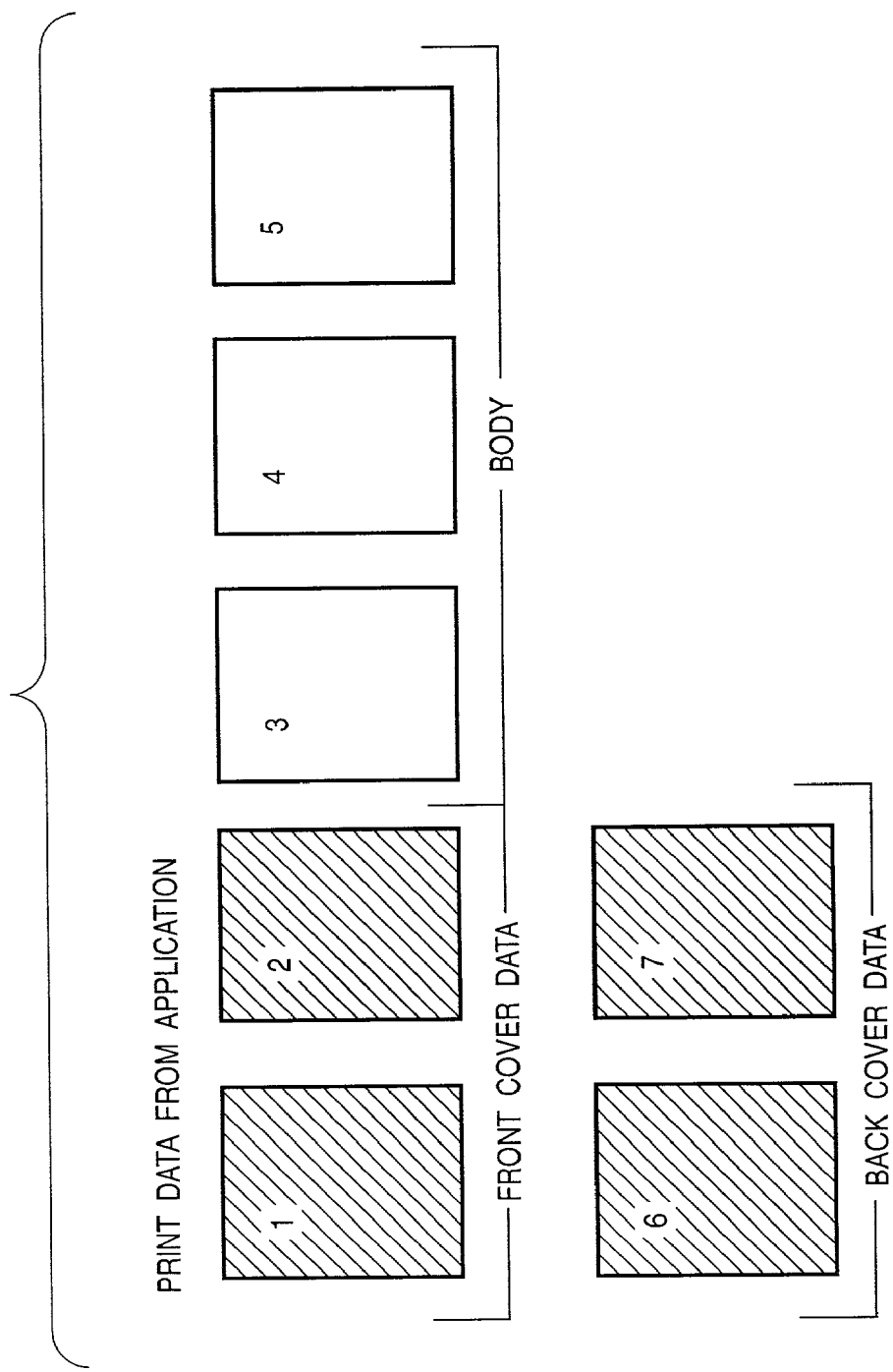
FIG. 26 is a view for explaining an outline of a bookbinding print process according to the embodiment of the present invention.

If the number of pages is equal to or larger than 5, an imposing process (S1907) of cover pages is done. This process mainly includes a process (S2101) for respectively imposing the first and second pages on the obverse surface of a front cover (to be referred to as a "front cover" in this embodiment) and on its reverse surface (to be referred to as a "reverse" in this embodiment), and a process (S2102) for respectively imposing the last page and last page—1 on the obverse surface of a back cover (to be referred to as a back cover in this embodiment) and its reverse surface (to be referred to as a "reverse of the back cover" in this embodiment), as shown in FIG. 21. The process (S2101) for imposing the first and second pages on the obverse and reverse surfaces of the front cover is a process for assigning the first and second pages of print data from the application on a and b in FIG. 23. Also, the process (S2102) for imposing the last page and last page—1 on the obverse and reverse surfaces of the back cover is a process for assigning the last page—1 and last page of print data from the application on c and d in FIG. 23. For example, if print data from the application consists of 7 pages, as shown in FIG. 26, the first and second pages are assigned to a and b, and the sixth and seventh pages are assigned to c and d (a left-opening book is assumed in this case).

After that, a bookbinding imposing process (S1909) of the remaining pages is executed. In this process, print data from the application except for the front and back cover data are assigned to an inner paper sheet (or sheets) as a bookbinding print process. If print data consists of 7 pages, as shown in FIG. 26, the third, fourth, and fifth pages are assigned to e, f, and g of FIG. 23.

Figure 24:
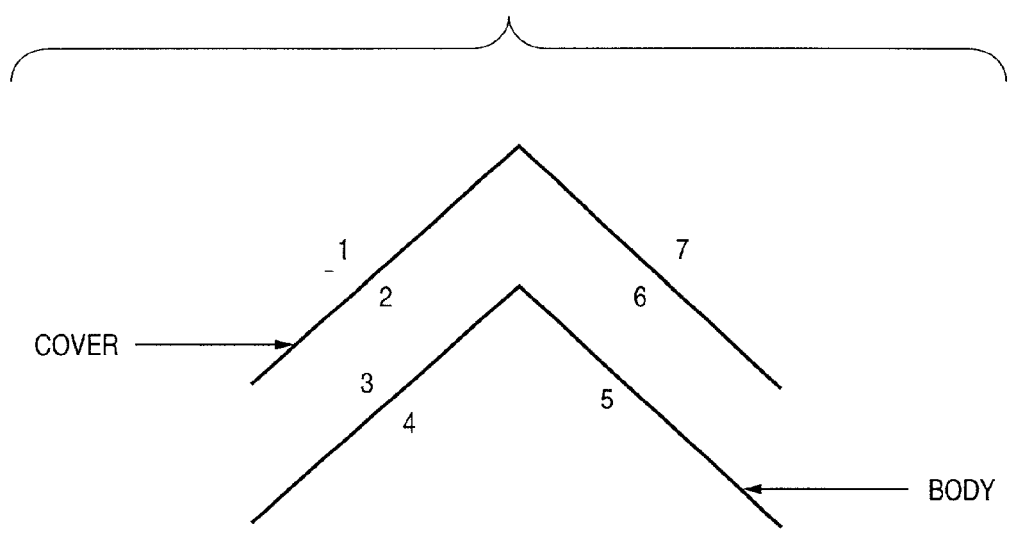
FIG. 24 is a view for explaining an outline of a bookbinding print process according to the embodiment of the present invention.
Figure 30:
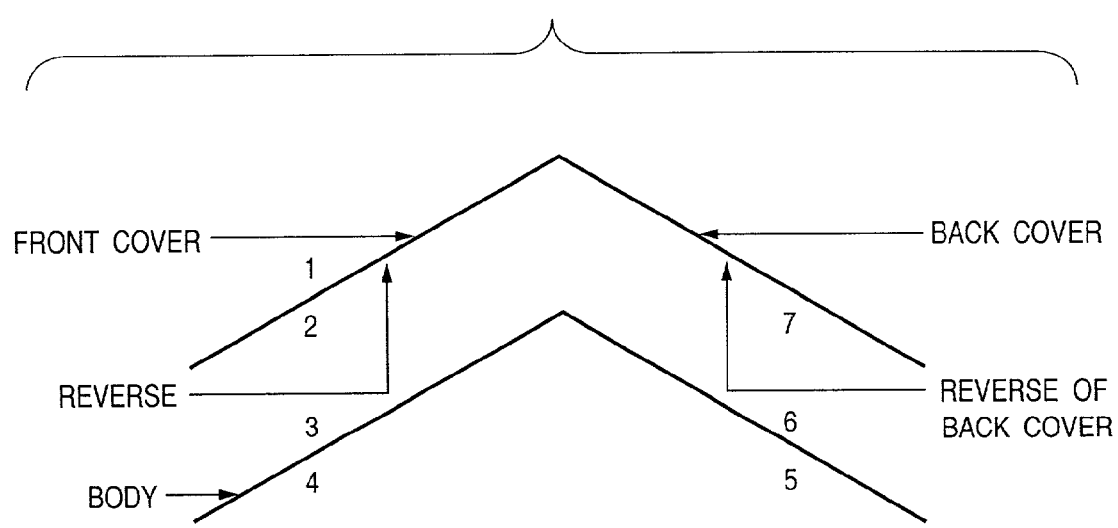
FIG. 30 is a view for explaining a bookbinding print process using a conventional printer driver.

After that, a despool process (S1910) including the cover portion having the front cover, its reverse, back cover, and its reverse that have undergone the imposing process is executed. The despooler 305 reads out and imposes print data that has undergone the imposing process (S1907) of the cover pages and the bookbinding imposing process (S1909) of the remaining pages from the spool file 303 in the order they are imposed, re-generates a rendering function (GDI function) that the graphic engine 202 as rendering means provided by the OS can interpret, and outputs the generated rendering function to the graphic engine 202. In this way, the printer driver 203 receives from the graphic engine 202 the rendering contents as the bookbinding imposing process result on the cover and inner paper sheets, and the printer 1500 executes a bookbinding print process of print data generated according to the rendering contents, thus obtaining a bookbinding print result including the cover page rendering contents which are printed normally. FIG. 24 shows a result obtained in this way. As can be seen from comparison with FIG. 30 as the aforementioned conventional print result, the rendering contents are normally printed on the "back cover" and "reverse of back cover".

If it is determined in the determination process (S1906) for checking if the total number of pages of print data from the application is equal to or larger than n that the number of pages is smaller than 5, an imposing process (S1908) of cover pages when the total number of pages is less than 5 is executed. This process is executed when the number of pages of data sent from the application is smaller than that required for the imposing process of the cover pages. In this process, page data are imposed on a, b, c, and d in FIG. 23 in the order they are received. For example, if data consists of 3 pages, the first, second, and third pages are respectively imposed on a, b, and c.

In this manner, even when the number of logical pages of a document which is output from the application in consideration of a print process on cover pages assumes a value that does not consider the imposing process in the bookbinding print process, the print control program of this embodiment can normally execute the imposing process of cover pages, thus obtaining a bookbinding print result that the user wants.

Second Embodiment

Figure 20:
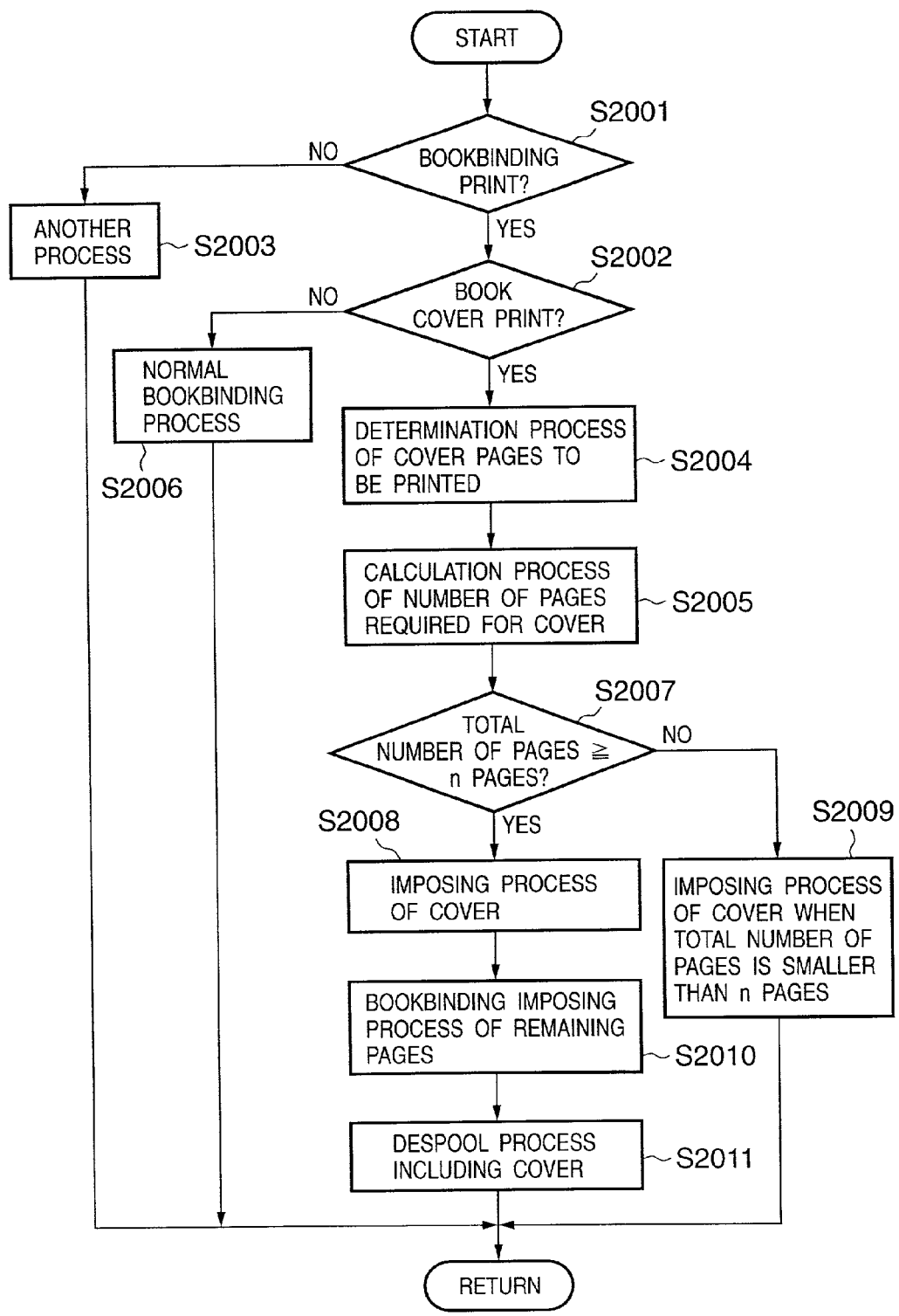
FIG. 20 is a flow chart showing the processing flow of the spool file manager 304 of the present invention.

According to the second embodiment of the present invention, pages to be printed of the front and back covers may be selected in the book cover print process. Such process will be explained using FIG. 20. As in the first embodiment, the spool file manager 304 loaded from the spooler 302 in a series of print processes reads a job setup file, and executes a determination process (S2001) for checking if a bookbinding print process is to be done. In this process, it is checked if the user has designated a bookbinding print process on the user interface (FIG. 28) of the driver. If the user has not designated a bookbinding print process, another process (S2003) is executed since such case falls outside the scope of this invention. In the following description, assume that the bookbinding print process has been designated.

A determination process (S2002) is executed to check if a book cover print process is done. In this process (S2002), it is checked as in bookbinding print designation if the user has designated a book cover print process from the user interface (FIG. 29) of the driver. If a book cover print process has not been designated, a normal bookbinding print process is done (S2006), and a normal imposing process for bookbinding is executed. In the following description, assume that the book cover print process has been designated.

Figure 22:
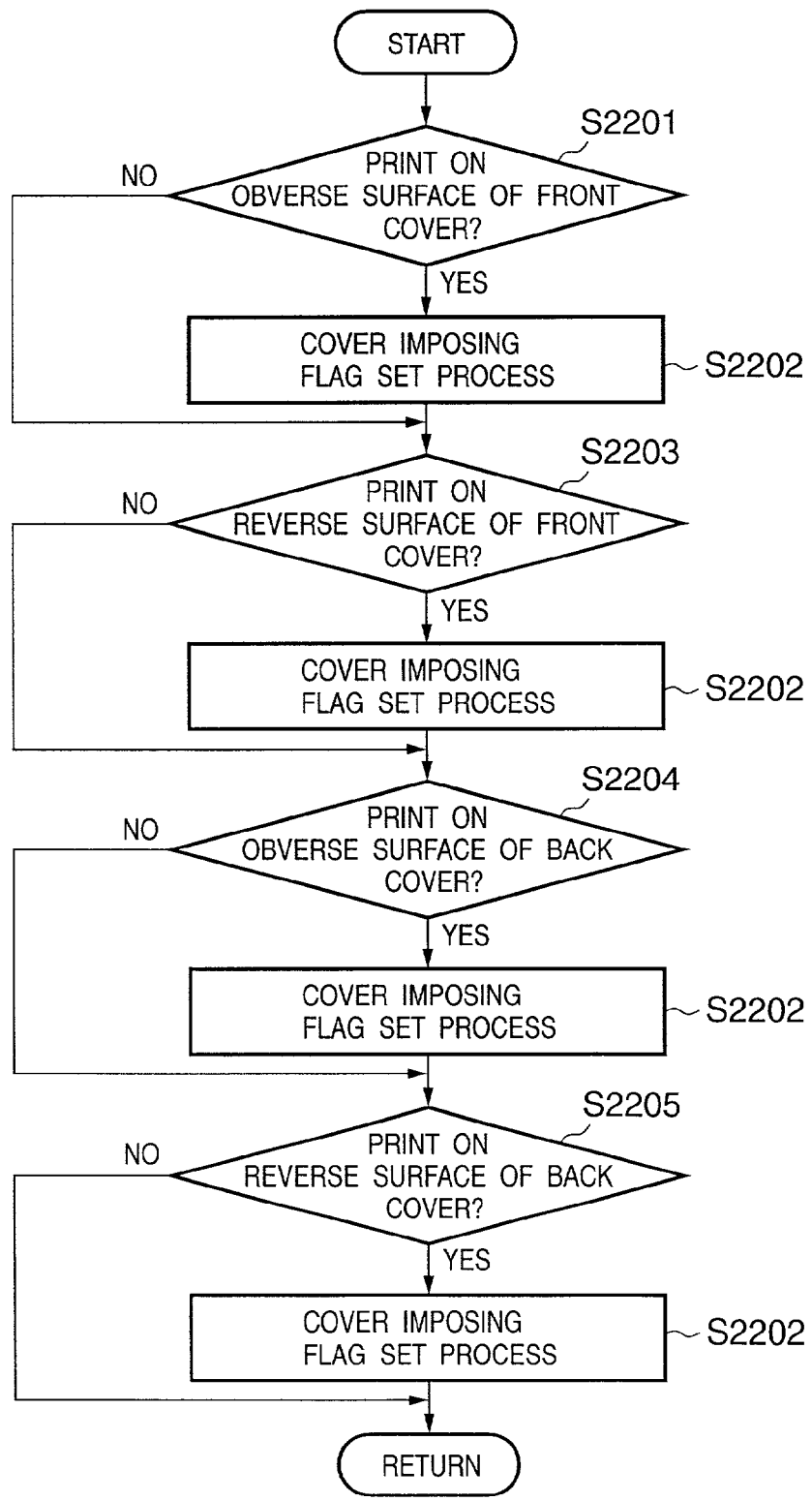
FIG. 22 is a flow chart showing the processing flow of the spool file manager 304 of the present invention.

A determination process of pages to be printed of a cover is executed. In this process, pages to be printed of the "front cover", "reverse", "back cover", and "reverse of back cover" of the cover are determined. Assume that the pages to be printed can be selected upon designating the book cover print from the user interface (FIG. 29) of the driver. On the user interface shown in FIG. 29, an item "all cover pages" is selected. In addition, a plurality of cover imposing modes such as print on "front and back covers", print on "front cover and reverse", and the like are available. In place of selecting the imposing mode using such pull-down window, four radio buttons "print on front cover", "print on reverse", "print on back cover", and "print on reverse of back cover" may be prepared and may be selected by the user to make print setups of cover pages. This process can be implemented as follows. That is, as shown in the flow chart in FIG. 22, the spool file manager 304 checks if each cover page is to undergo a print process, and executes a cover imposing flag set process (S2202). For example, if "print on front and back covers" is selected from the user interface, no cover imposing flags are set for "reverse" and "reverse of back cover".

A calculation process (S2005) for calculating the number of pages required for a cover is executed. In this process, the number of pages to be printed on a book cover is calculated. In this embodiment, since "print on front and back covers" is selected, two pages are required. A determination process (S2007) is executed to check if the total number of pages of print data from the application is equal to or larger than n. In this process, the number of pages calculated by the calculation process (S2005) of the number of pages required for a cover is compared with that of print data from the application. In this case, it is checked if the number of pages of the print data is equal to or larger than 2. If the number of pages is equal to or larger than n, it is determined that predetermined pages (first and last pages when "print on front and back covers" is selected) are imposed on a cover portion; if the number of pages is smaller than n, it is determined all logical pages output from the application are imposed on a cover portion (cover page determination process).

If the number of pages is equal to or larger than 2, an imposing process (S2008) of cover pages is done. In this process, the obverse and reverse surfaces of the front and back covers respectively undergo an imposing process. In this embodiment, since cover pages to be printed can be selected, the way pages to be printed are assigned to the front and back covers varies.

Figure 23:
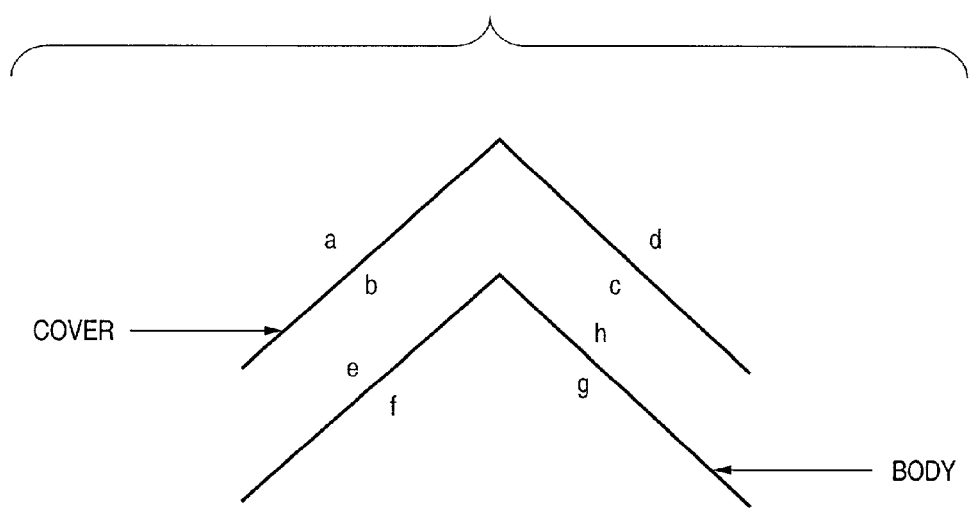
FIG. 23 is a view for explaining an outline of a bookbinding print process according to an embodiment of the present invention.
Figure 27:
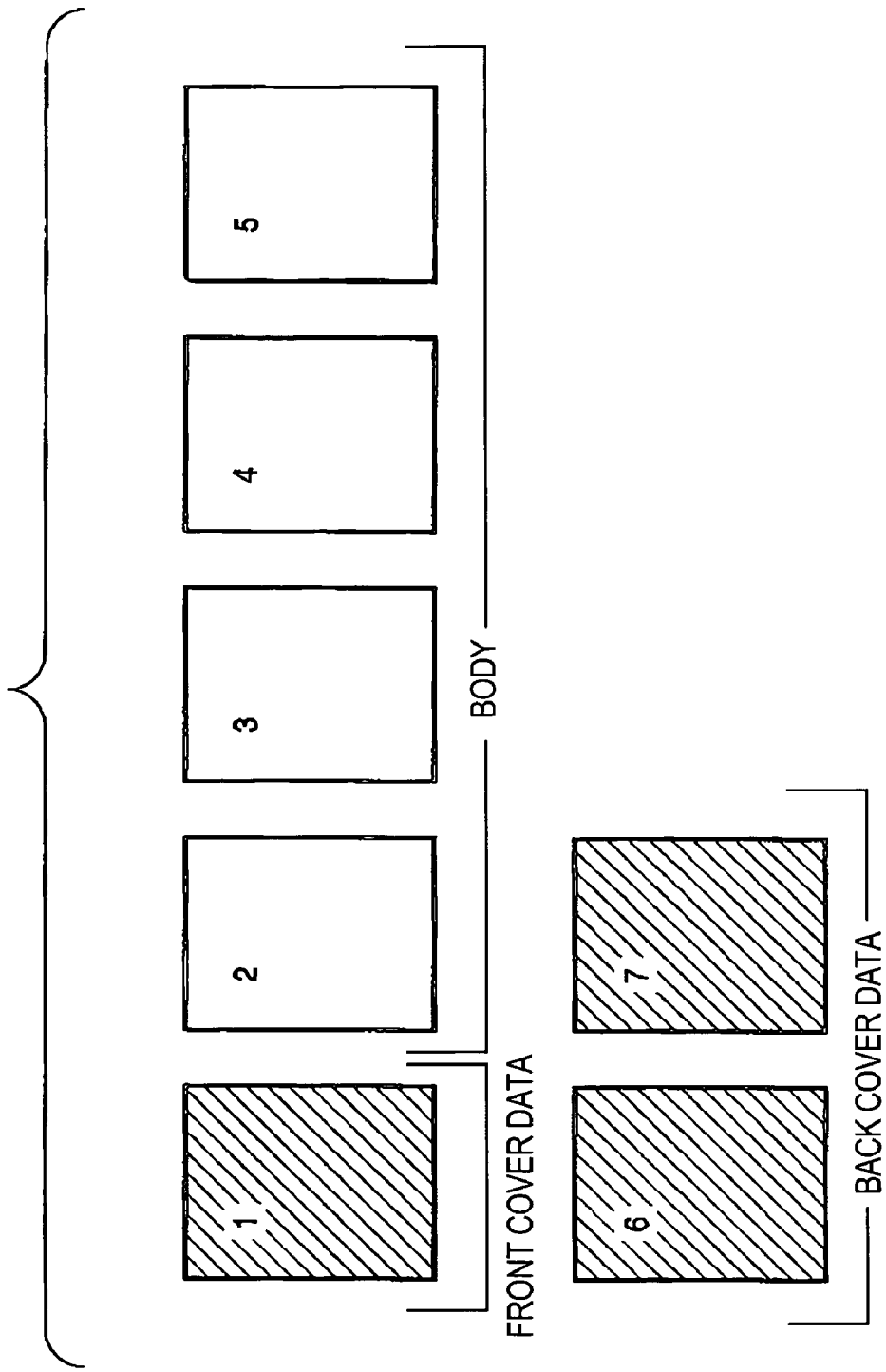
FIG. 27 is a view for explaining an outline of a bookbinding print process according to the embodiment of the present invention.

For example, if the radio buttons "print on front cover", "print on back cover", and "print on reverse of back cover" are respectively selected, if the total number of pages is 7, as shown in FIG. 27, the first page is assigned to a in FIG. 23, b is blank, the sixth page is assigned to c, and the seventh page is assigned to d (a left-opening book is also assumed in this case).

After that, a bookbinding imposing process (S2010) of the remaining pages is executed. In this process, print data from the application except for the front and back cover data are assigned to an inner paper sheet (or sheets) as a bookbinding print process. In this case, the spool file manager 304 assigns the second, third, fourth, and fifth pages to e, f, g, and h of FIG. 23.

Figure 25:
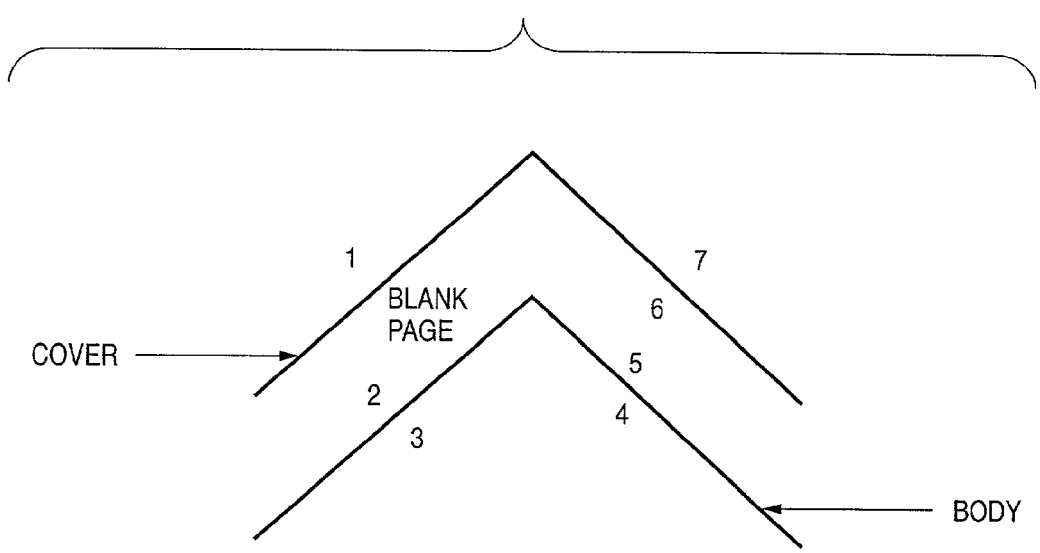
FIG. 25 is a view for explaining an outline of a bookbinding print process according to the embodiment of the present invention.

After that, a despool process (S2011) including the cover is executed. In this process, print data that has undergone the imposing process (S2007) of the cover pages and the bookbinding imposing process (S2009) is despooled. In this manner, a bookbinding print result in which data are imposed on a cover sheet and inner sheet (body) is obtained. FIG. 25 shows a result obtained in this manner (corresponding to a case wherein the radio button "print on reverse" is not selected).

If it is determined in the determination process (S2007) for checking if the total number of pages of print data from the application is equal to or larger than n that the number of pages is smaller than 3, an imposing process (S2009) of cover pages when the total number of pages is less than n is executed. This process is executed when the number of pages of data sent from the application is smaller than that required for the imposing process of the cover pages, and a process of imposing data on effective print surfaces a, b, c, and d in FIG. 23 in the order they are received. For example, if data consists of 2 pages and "not print on reverse of cover page" is selected, the first page is imposed on a, and the second page is imposed on c.

As described above, according to the second embodiment, since an imposing process of cover pages can be done for only pages of user's choice, various bookbinding print results can be easily obtained without considering any complicated rendering order on cover pages upon creating a document using the application.

Note that the present invention may be applied to either a system constituted by a plurality of devices (e.g., a host computer, an interface device, a reader, a printer, and the like), or an apparatus consisting of a single piece of equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As described above, according to the information processing apparatus and method, program, and storage medium that stores the program of the present invention, an information process for making bookbinding setups for a document can be executed, and a book cover that the user wants can be obtained by selecting whether or not the obverse and reverse surfaces of front and back covers are to be printed.

As many apparently widely different embodiments of the present invention can be made without departing from the spirit and scope thereof, it is to be understood that the invention is not limited to the specific embodiments thereof except as defined in the claims.

What is claimed is:

1. An information processing apparatus for making a bookbinding setup for a document, comprising:
   cover page determination means for determining pages to be imposed on a cover page from input data of a plurality of pages;
   cover imposing processing means for executing an imposing process of cover pages on the basis of data of the pages determined by said cover page determination means;
   bookbinding imposing processing means for executing an imposing process of running text pages on the basis of data of the remaining pages which are not imposed on the cover pages by said cover imposing processing means;
   first determination processing means for checking if the total number of pages of print data is not less than n;
   first imposing processing means for, when said first determination processing means determines that the total number of pages of print data is not less than n, executing a first imposing process of cover pages;
   bookbinding imposing processing means for executing a bookbinding imposing process of the remaining pages after the process of said first imposing processing means; and
   second imposing processing means for, when said first determination processing means determines that the total number of pages of print data is less than n, executing a second imposing process of less than n cover pages.

2. The apparatus according to claim 1, further comprising:
   second determination processing means for determining cover pages to be printed.

3. The apparatus according to claim 1, wherein said cover imposing processing means comprises processing means for imposing first and second pages on obverse and reverse surfaces of a front cover, and processing means for imposing a last page—1 on obverse and reverse surfaces of a back cover.

4. The apparatus according to claim 2, wherein said second determination processing means for determining cover pages to be printed comprises:
- third determination processing means for checking if the obverse surface of the front cover is to be printed;
- fourth determination processing means for checking if the reverse surface of the front cover is to be printed;
- fifth determination processing means for checking if the obverse surface of the back cover is to be printed; and
- sixth determination processing means for checking if the reverse surface of the back cover is to be printed.

5. An information processing method for making a bookbinding setup for a document, comprising:
- the cover page determination step of determining pages to be imposed on a cover page from input data of a plurality of pages;
- the cover imposing processing step of executing an imposing process of cover pages on the basis of data of the pages determined in the cover page determination step;
- the bookbinding imposing processing step of executing an imposing process of running text pages on the basis of data of the remaining pages which are not imposed on the cover pages in the cover imposing processing step;
- the first determination processing step of checking if the total number of pages of print data is not less than n;
- the first imposing processing step of executing, when it is determined in the first determination processing step that the total number of pages of print data is not less than n, a first imposing process of cover pages;
- the bookbinding imposing processing step of executing a bookbinding imposing process of the remaining pages after the process of the first imposing processing step; and
- the second imposing processing step of executing, when it is determined in the first determination processing step that the total number of pages of print data is less than n, a second imposing process of less than n cover pages.

6. The method according to claim 5, further comprising:
- the second determination processing step of determining cover pages to be printed.

7. The method according to claim 5, wherein the cover imposing processing step comprises the processing step of imposing first and second pages on obverse and reverse surfaces of a front cover, and the processing step of imposing a last page and last page—1 on obverse and reverse surfaces of a back cover.

8. The method according to claim 6, wherein the second determination processing step of determining cover pages to be printed comprises:
- the third determination processing step of checking if the obverse surface of the front cover is to be printed;
- the fourth determination processing step of checking if the reverse surface of the front cover is to be printed;
- the fifth determination processing step of checking if the obverse surface of the back cover is to be printed; and
- the sixth determination processing step of checking if the reverse surface of the back cover is to be printed.

9. A computer readable storage medium which stores a print control program module, said program module comprising:
- a cover page determination module for determining pages to be imposed on a cover page from input data of a plurality of pages;
- a cover imposing processing module for executing an imposing process of cover pages on the basis of data of the pages determined by said cover page determination module;
- a bookbinding imposing processing module for executing an imposing process of running text pages on the basis of data of the remaining pages which are not imposed on the cover pages by said cover imposing processing module;
- a first determination processing module for checking if the total number of pages of print data is not less than n;
- a first imposing processing module for, when said first determination processing module determines that the total number of pages of print data is not less than n, executing a first imposing process of cover pages;
- a bookbinding imposing processing module for executing a bookbinding imposing process of the remaining pages after the process of said first imposing processing module; and
- a second imposing processing module for, when said first determination processing module determines that the total number of pages of print data is less than n, executing a second imposing process of less than n cover pages.

10. The medium according to claim 9, wherein said program module further comprises:
- a second determination processing module for determining cover pages to be printed.

11. The medium according to claim 9, wherein said cover imposing processing module comprises a processing module for imposing first and second pages on obverse and reverse surfaces of a front cover, and a processing module for imposing a last page and last page—1 on obverse and reverse surfaces of a back cover.

12. The medium according to claim 10, wherein said second determination processing module for determining cover pages to be printed comprises:
- a third determination processing module for checking if the obverse surface of the front cover is to be printed;
- a fourth determination processing module for checking if the reverse surface of the front cover is to be printed;
- a fifth determination processing module for checking if the obverse surface of the back cover is to be printed; and
- a sixth determination processing module for checking if the reverse surface of the back cover is to be printed.

13. A program, stored on a computer-readable medium, for making a computer execute an information process for generating print data used to obtain a bookbinding print result using a printer, said program executing the information process by specifying functions to be executed by the computer as:
- a cover page determination step of determining pages to be imposed on a cover page from input data of a plurality of pages;
- a cover imposing processing step of executing an imposing process of cover pages on the basis of data of the pages determined in said cover page determination step; and
- a bookbinding imposing processing step of executing an imposing process of running text pages on the basis of data of the remaining pages which are not imposed on the cover pages in said cover imposing processing step;
- a first determination processing step of checking if the total number of pages of print data is not less than n;

a first imposing processing step of, when it is determined in said first determination processing step that the total number of pages of print data is not less than n, executing a first imposing process of cover pages;

a bookbinding imposing processing step of executing a bookbinding imposing process of the remaining pages after the process of said first imposing processing step; and a second imposing processing step of, when it is determined in said first determination processing step that the total number of pages of print data is less than n, executing a second imposing process of less than n cover pages.

14. The program according to claim 13, wherein said program executes the information process by further specifying the functions executed by the computer as a second determination processing step of determining cover pages to be printed.

15. The program according to claim 13, wherein said program executes the information process by specifying functions of said cover imposing processing step comprises a processing step of imposing first and second pages on obverse and reverse surfaces of a front cover, and a processing step of imposing a last page and last page—1 on obverse and reverse surfaces of a back cover.

16. The program according to claim 14, wherein said program executes the information process by specifying functions of said second determination processing step of determining cover pages to be printed as:

a third determination processing step of checking if the obverse surface of the front cover is to be printed;

a fourth determination processing step of checking if the reverse surface of the front cover is to be printed;

a fifth determination processing step of checking if the obverse surface of the back cover is to be printed; and a sixth determination processing step of checking if the reverse surface of the back cover is to be printed.

* * * * *